US010382781B2

(12) United States Patent
Zhao et al.

(10) Patent No.: US 10,382,781 B2
(45) Date of Patent: Aug. 13, 2019

(54) INTERPOLATION FILTERS FOR INTRA PREDICTION IN VIDEO CODING

(71) Applicant: QUALCOMM Incorporated, San Diego, CA (US)

(72) Inventors: Xin Zhao, San Diego, CA (US); Vadim Seregin, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/709,270

(22) Filed: Sep. 19, 2017

(65) Prior Publication Data

US 2018/0091825 A1 Mar. 29, 2018

Related U.S. Application Data

(60) Provisional application No. 62/401,067, filed on Sep. 28, 2016.

(51) Int. Cl.

| | |
|---|---|
| ***H04N 19/102*** | (2014.01) |
| ***H04N 19/105*** | (2014.01) |
| ***H04N 19/11*** | (2014.01) |
| ***H04N 19/115*** | (2014.01) |
| ***H04N 19/119*** | (2014.01) |
| ***H04N 19/573*** | (2014.01) |
| ***H04N 19/117*** | (2014.01) |
| ***H04N 19/159*** | (2014.01) |
| ***H04N 19/176*** | (2014.01) |
| ***H04N 19/82*** | (2014.01) |
| ***H04N 19/593*** | (2014.01) |
| ***H04N 19/59*** | (2014.01) |

(52) U.S. Cl.

CPC ......... *H04N 19/573* (2014.11); *H04N 19/117* (2014.11); *H04N 19/159* (2014.11); *H04N 19/176* (2014.11); *H04N 19/59* (2014.11); *H04N 19/593* (2014.11); *H04N 19/82* (2014.11)

(58) Field of Classification Search

CPC .... H04N 19/102; H04N 19/105; H04N 19/11; H04N 19/115; H04N 19/119

USPC .................................................... 375/240.02

See application file for complete search history.

(56) References Cited

U.S. PATENT DOCUMENTS

| | | | |
|---|---|---|---|
| 2012/0183041 | A1 | 7/2012 | Maani et al. |
| 2014/0233646 | A1 | 8/2014 | Matsuo et al. |

(Continued)

OTHER PUBLICATIONS

Reply to Written Opinion from corresponding PCT Application Serial No. PCT/US2017/052485 filed on Jun. 2, 2018 (7 pp).

(Continued)

*Primary Examiner* — Dominic D Saltarelli

(74) *Attorney, Agent, or Firm* — Shumaker & Sieffert, P.A.

(57) ABSTRACT

Techniques are described in which a video coder is configured to determine, using one or more characteristics of an interpolation filter, a number of reference samples to be stored at a reference buffer. The video coder is further configured to generate a plurality of values corresponding to the number of reference samples in the reference buffer. The video coder is further configured to generate prediction information for intra-prediction using the interpolation filter and the plurality of values. The video coder is further configured to reconstruct the block of video data based on the prediction information.

30 Claims, 17 Drawing Sheets

(56) References Cited

U.S. PATENT DOCUMENTS

2017/0085913 A1* 3/2017 Chen .................... H04N 19/583
2018/0255295 A1* 9/2018 Lee ........................ H04N 19/00

OTHER PUBLICATIONS

Second Written from corresponding PCT Application Serial No. PCT/US2017/052485 dated Aug. 9, 2018 (9 pp).
International Search Report and Written Opinion—PCT/US2017/052485—ISA/EPO—Dec. 11, 2017.
Matsuo S., et al., "Improved Intra Angular Prediction by DCT-Based Interpolation Filter", IEEE Proceedings of the 20th European Signal Processing Conference (EUSIPCO), Aug. 27, 2012 (Aug. 27, 2012), pp. 1568-1572, KP032254770, ISBN: 978-1-4673-1068-0.
Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP55388661, USA ISSN: 1051-8215, DOI: 10.1109/TCSVT.2012.2221191, pp. 1649-1668.
Zhang X., et al., "New Chroma Intra Prediction Modes Based on Linear Model for HEVC", 2012 19th IEEE International Conference on Image Processing (ICIP), Sep. 30, 2012, pp. 197-200, XP032333147, DOI: 10.1109/ICIP.2012.6466829, ISBN: 978-1-4673-2534-9.
Wang et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, 25 Jul. 25-Aug. 2, 2013, 311 pp.
Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26 through Jun. 1, 2016, 37 Pages.
Bossen, et al., "HM Software Manual," Joint Collaborative Team on Video Coding (JCT-VC) of ITU-T SG 16 WP 3 and ISO/IEC JTC 1/SC 29/WG 11, Document: JCTVC-Software Manual, Apr. 3, 2014, 17 pp.
International Preliminary Report on Patentability from corresponding PCT Application Serial No. PCT/US2017/052485 dated Nov. 12, 2018 (17 pp).

* cited by examiner

INTERPOLATION FILTERS FOR INTRA PREDICTION IN VIDEO CODING

RELATED APPLICATIONS

This application claims the benefit of U.S. Provisional Application No. 62/401,067, filed Sep. 28, 2016, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to interpolation filtering used in conjunction with intra prediction. One or more techniques described herein may be used in the context of advanced video codecs, such as extensions of HEVC or the next generation of video coding standards.

In one example, the disclosure describes a method of processing a block of video data, the method including determining, using one or more characteristics of an interpolation filter, a number of reference samples to be stored at a reference buffer. The method further includes generating a plurality of values corresponding to the number of reference samples in the reference buffer. The method further includes generating prediction information for intra-prediction using the interpolation filter and the plurality of values. The method further includes reconstructing the block of video data based on the prediction information.

In one example, the disclosure describes an apparatus for processing a block of video data including a memory configured to store the video data and one or more processors. The one or more processors are configured to determine, using one or more characteristics of an interpolation filter, a number of reference samples to be stored at a reference buffer. The one or more processors are configured to generate a plurality of values corresponding to the number of reference samples in the reference buffer. The one or more processors are configured to generate prediction information for intra-prediction using the interpolation filter and the plurality of values. The one or more processors are configured to reconstruct the block of video data based on the prediction information.

In one example, the disclosure describes a non-transitory computer-readable storage medium storing instructions that, when executed, cause one or more processors of a device for coding video data to determine, using one or more characteristics of an interpolation filter, a number of reference samples to be stored at a reference buffer. The instructions further cause the one or more processors to generate a plurality of values corresponding to the number of reference samples in the reference buffer. The instructions further cause the one or more processors to generate prediction information for intra-prediction using the interpolation filter and the plurality of values. The instructions further cause the one or more processors to reconstruct the block of video data based on the prediction information.

In one example, the disclosure describes an apparatus for processing a block of video data including means for determining, using one or more characteristics of an interpolation filter, a number of reference samples to be stored at a reference buffer. The apparatus further includes means for generating a plurality of values corresponding to the number of reference samples in the reference buffer. The apparatus further includes means for generating prediction information for intra-prediction using the interpolation filter and the plurality of values. The apparatus further includes means for reconstructing the block of video data based on the prediction information.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
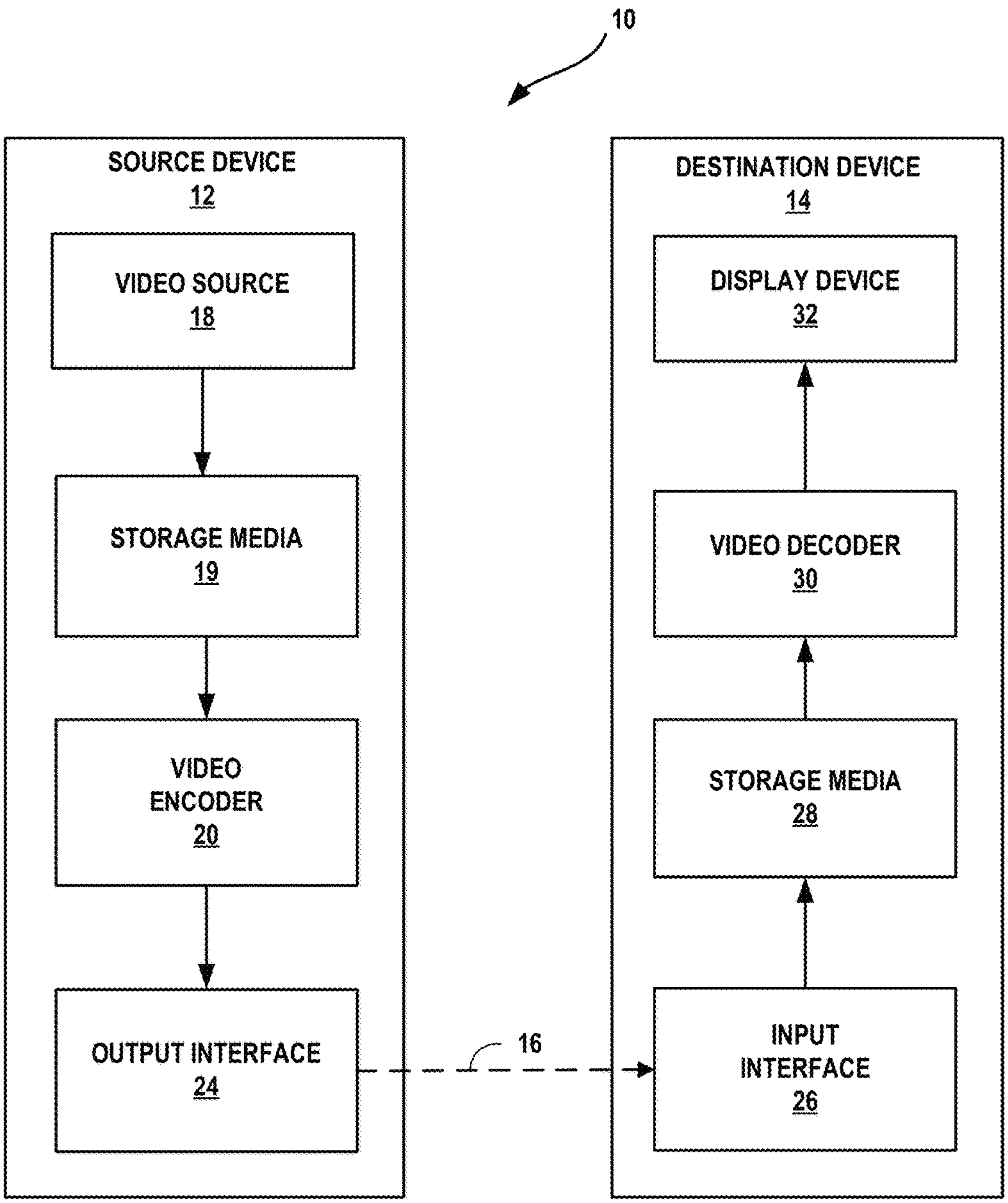
FIG. 1 is a block diagram illustrating an example video encoding and decoding system that may utilize one or more techniques described in this disclosure.

In general, this disclosure describes techniques related to interpolation filters for intra prediction in video coding. The interpolation filters may be used in the context of advanced video codecs, such as extensions of HEVC or the next generation of video coding standards.

A video encoder may generate residual blocks of video data in a form suitable for output from the video encoder to a video decoder. A video decoder may generate predictive blocks using an interpolation filter and generate coding blocks of video data using the residual blocks and the predictive blocks. It is desirable to reduce an amount of data used to represent the residual blocks such that an amount of data transmitted from the video encoder to the video decoder is reduced. Generally, as an accuracy of the interpolation filter increases, an amount of data transmitted from the video encoder to the video decoder for representing residual blocks decreases.

In video coding, 4-tap interpolation filters may use reference samples stored in a reference sample buffer. In some techniques, a reference sample buffer for an M×N block may include 2*(M+N)+1 reference samples for intra prediction. Longer-tap filters (e.g., with respect to 4-tap), such as, 6-tap, 8-tap, or another longer-tap filter, may further improve coding performance compared to a 4-tap interpolation filters. However, such longer-tap interpolation filters are not typically implemented for video coding due to complexities in obtaining more reference samples compared to a 4-tap interpolation filter.

Additionally, for reference pixels arranged near block boundaries, video encoders and decoders may access a reference sample that is out of range (i.e., not available) of reference samples stored in a reference sample buffer for certain interpolation filters. To accommodate reference pixels that are out of range, some techniques may include a video encoder and/or video decoder performing a clipping operation that uses a neighboring reference value with respect to the unavailable reference sample, which may add complexity compared to interpolation filters having fewer taps that do not result in a reference sample that is out of range of reference samples stored in a reference sample buffer.

Moreover, some techniques for interpolation filtering may include a intra reference sample mapping process that performs a rounding operation. However, the rounding operations may present prediction error along the predicted direction, thereby adding error to resulting residual blocks.

Rather than relying on a reference sample buffer for a M×N block that includes a static number (e.g., a fixed number such as 2*(M+N)+1) of reference samples for intra prediction, a video coder (e.g., a video decoder, a video encoder, etc.) may generate a reference sample buffer that includes a dynamic (e.g., an adaptive or modifiable) number of reference samples that accommodates one or more characteristics of an interpolation filter used for image block prediction. In this way, the video coder using a dynamic number of reference samples may select a number of reference samples that permits longer-tap filters compared to video coders using a static number (e.g., 2*(M+N)+1) of reference samples. Moreover, the video coder using a dynamic number of reference samples may select a number of reference samples to reduce or eliminate a number of clipping operations compared to video coders using a static number (e.g., 2*(M+N)+1) of reference samples. Further, the video coder using a dynamic number of reference samples may select reference samples to reduce or eliminate intra reference sample mapping processes that perform a rounding operation, thereby reducing error to resulting residual blocks compared to video coders using a static number (e.g., 2*(M+N)+1) of reference samples.

Rather than applying a single interpolation filter to a block, slice, tile, or picture, a video coder may select an interpolation filter for each a block, slice, tile, or picture. In this way, the video coder using a multiple interpolations filters may select interpolation filters based on complexities in obtaining more reference samples to permit more efficient use of longer-tap interpolation filters compared to video coders using a single interpolations filter for an entire block, slice, tile, or picture.

Rather than using a nearest neighboring reference to derive reference values, a video coder may apply an interpolation filter to the neighboring reference samples to derive a value. In this way, a video coder applying an interpolation filter may reduce an error of resulting residual blocks compared to video coders using a nearest neighboring reference to derive reference values.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video coding device, more specifically, an example video encoding device (i.e., a device for encoding video data). Destination device 14 is an example video coding device, more specifically, an example video decoding device (i.e., a device for decoding video data). As used herein, a video coder may refer to a video decoder (e.g., video decoding device), video encoder (e.g., video encoding device), or another video coding device.

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip.

In some examples, video encoder 20 may be configured to select an interpolation filter from multiple interpolation filters and generate, using the interpolation filter, prediction information for reconstructing a block of video data. For example, video encoder 20 may select a filter that uses a largest quantity of available references samples from a reference sample buffer compared to other filters of the multiple filters and that would not use any references samples that are not included in the reference sample buffer. Similarly, video decoder 30 may be configured to select an interpolation filter from multiple interpolation filters and generate, using the interpolation filter, prediction information for reconstructing a block of video data. For example, video decoder 30 may select a filter that uses a largest quantity of available references samples from a reference sample buffer compared to other filters of the multiple filters and that would not use any references samples that are not included in the reference sample buffer.

More specifically, for example, video encoder 20 may be configured to determine a target interpolation filter type and a target interpolation filter tap for a video block. For instance, video encoder 20 may be configured to determine a target interpolation filter type and/or a target interpolation filter tap based on a block height and/or width for the video block. In some instances, video encoder 20 may be configured to determine a target interpolation filter type and/or a target interpolation filter tap based on a shape of the video block. In some instances, video encoder 20 may be configured to determine a target interpolation filter type and/or a target interpolation filter tap based on an area size of the video block. In some instances, video encoder 20 may be configured to determine a target interpolation filter type and/or a target interpolation filter tap based on an intra prediction mode. In some instances, video encoder 20 may be configured to determine a target interpolation filter type and/or a target interpolation filter tap based on neighboring decoded information (e.g., reconstructed sample values of a neighboring block). In any case, video encoder 20 may select an interpolation filter that corresponds to the target interpolation filter type and a target interpolation filter tap for a video block and generate, using the selected interpolation filter, prediction information for reconstructing the video block.

Similarly, for example, video decoder 30 may be configured to determine a target interpolation filter type and a target interpolation filter tap for a video block. For instance, video decoder 30 may be configured to determine a target interpolation filter type and/or a target interpolation filter tap based on a block height and/or width for the video block. In some instances, video decoder 30 may be configured to determine a target interpolation filter type and/or a target interpolation filter tap based on a shape of the video block. In some instances, video decoder 30 may be configured to determine a target interpolation filter type and/or a target interpolation filter tap based on an area size of the video block. In some instances, video decoder 30 may be configured to determine a target interpolation filter type and/or a target interpolation filter tap based on an intra prediction mode. In some instances, video decoder 30 may be configured to determine a target interpolation filter type and/or a target interpolation filter tap based on neighboring decoded information (e.g., reconstructed sample values of a neighboring block). In any case, video decoder 30 may select an interpolation filter that corresponds to the target interpolation filter type and a target interpolation filter tap for a video block and generate, using the selected interpolation filter, prediction information for reconstructing the video block.

Video encoder 20 may be configured to apply different filters to a single video block. For example, video encoder 20 may be configured to select a first interpolation filter from multiple interpolation filters for a first portion (e.g., sub-block) of a video block and a second interpolation filter from the multiple interpolation filters for a second portion (e.g., sub-block) of a video block, where the first and second interpolation filters are different. For instance, video encoder 20 may be configured to select a 4-tap interpolation filter from the multiple interpolation filters for the first portion (e.g., sub-block) of the video block when video encoder 20 may apply the 4-tap interpolation filter using references samples included in a reference sample buffer and when the reference sample buffer does not include at least one reference sample for a 6-tap interpolation filter. In this instance, video encoder 20 may be configured to select a 6-tap interpolation filter from the multiple interpolation filters for the second portion (e.g., sub-block) of the video block when video encoder 20 may apply the 6-tap interpolation filter using references samples included in the reference sample buffer. Video encoder 20 may determine a prediction block, where to determine the prediction block includes applying the first interpolation filter to the first portion of the video block and applying the second interpolation filter to the second portion of the video block.

Similarly, video decoder 30 may be configured to apply different filters to a single video block. For example, video decoder 30 may be configured to select a first interpolation filter from multiple interpolation filters for a first portion (e.g., sub-block) of a video block and a second interpolation filter from the multiple interpolation filters for a second portion (e.g., sub-block) of a video block, where the first and second interpolation filters are different. For instance, video decoder 30 may be configured to select a 4-tap interpolation filter from the multiple interpolation filters for the first portion (e.g., sub-block) of the video block when video decoder 30 may apply the 4-tap interpolation filter using references samples included in a reference sample buffer and when the reference sample buffer does not include at least one reference sample for a 6-tap interpolation filter. In this instance, video decoder 30 may be configured to select a 6-tap interpolation filter from the multiple interpolation filters for the second portion (e.g., sub-block) of the video block when video decoder 30 may apply the 6-tap interpolation filter using references samples included in the reference sample buffer. Video decoder 30 may determine a prediction block, where to determine the prediction block includes applying the first interpolation filter to the first portion of the video block and applying the second interpolation filter to the second portion of the video block.

In some examples, video encoder 20 may be configured to derive a value for an extended reference sample and generate, using the value for the extended reference sample, prediction information for reconstructing a block of video data. Similarly, video decoder 30 may be configured to derive a value for an extended reference sample and generate, using the value for the extended reference sample, prediction information for reconstructing a block of video data.

More specifically, for example, video encoder 20 may be configured to apply a first filter to reference samples included in a reference sample buffer to generate an extended reference sample for an extended reference sample buffer, where the extended reference sample buffer includes reference samples from the reference sample buffer and the extended reference sample. In this example, video encoder 20 may apply a second filter to one or more reference samples included in the extended reference sample buffer to generate prediction information for reconstructing a block of video data. Similarly, for example, video decoder 30 may be configured to apply a first filter to reference samples included in a reference sample buffer to generate an extended reference sample for an extended reference sample buffer, where the extended reference sample buffer includes reference samples from the reference sample buffer and the extended reference sample. In this example, video decoder 30 may apply a second filter to one or more reference samples included in the extended reference sample buffer to generate prediction information for reconstructing a block of video data.

Video encoder 20 may be configured to generate a value for an extended reference sample buffer and generate, using the value for the extended reference sample buffer, prediction information for reconstructing a block of video data. Similarly, video decoder 30 may be configured to generate a value for an extended reference sample buffer and generate, using the value for the extended reference sample buffer, prediction information for reconstructing a block of video data.

More specifically, for example, video encoder 20 may generate one or more reference samples for an extended reference sample buffer that are supplemental to reference samples included in a reference sample buffer. In some examples, video encoder 20 may generate the one or more reference samples according to a filter type and/or filter tap of an interpolation filter. Said differently, for example, video encoder 20 may generate the one or more reference samples such that all reference samples to be applied by the interpolation filter are retrievable from the extended reference sample buffer.

Similarly, for example, video decoder 30 may generate one or more reference samples for an extended reference sample buffer that are supplemental to reference samples included in a reference sample buffer. In some examples, video decoder 30 may generate the one or more reference samples according to a filter type and/or filter tap of an interpolation filter. Said differently, for example, video decoder 30 may generate the one or more reference samples such that all reference samples to be applied by the interpolation filter are retrievable from the extended reference sample buffer.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may encode blocks of a picture of the video data. Video encoder 20 may include, in a bitstream, an encoded representation of the video block. For example, in HEVC, to generate an encoded representation of a picture, video encoder 20 may generate a set of coding tree units (CTUs). Each of the CTUs may comprise one or more coding tree blocks (CTBs) and may comprise syntax structures used to code the samples of the one or more coding tree blocks. For instance, each a CTU may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). A syntax structure may be defined as zero or more syntax elements present together in the bitstream in a specified order. The size of a CTB can range from 16×16 to 64×64 in the HEVC main profile (although technically 8×8 CTB sizes can be supported).

In HEVC, a slice includes an integer number of CTUs ordered consecutively in a raster scan order. Thus, in HEVC, the largest coding unit in a slice is called a coding tree block (CTB).

In HEVC, to generate a coded CTU of a picture, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise one or more coding blocks and syntax structures used to code samples of the one or more coding blocks. For example, a CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. Thus, a CTB may contain a quad-tree, the nodes of which are CUs.

Furthermore, video encoder 20 may encode a CU. For instance, to encode a CU, video encoder 20 may partition a coding block of a CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

In HEVC, each CU is coded with one mode, which could be either intra mode or inter mode. When a CU is inter coded (i.e., inter mode is applied), the CU may be further partitioned into 2 or 4 PUs or become just one PU when further partitioning does not apply. When two PUs are present in one CU, the two PUs can be half size rectangles or two rectangle sizes with ¼ or ¾ size of the CU.

When the CU is inter coded, one set of motion information is present for each PU. In addition, each PU is coded with a unique inter-prediction mode to derive the set of motion information. If video encoder 20 uses intra prediction to generate the predictive blocks of a PU, video encoder 20 may generate the predictive blocks of the PU based on decoded samples of the picture that includes the PU. When a CU is intra coded, 2N×2N and N×N are the only permissible PU shapes, and within each PU a single intra prediction mode is coded (while chroma prediction mode is signaled at CU level). The N×N intra PU shapes are only allowed when the current CU size is equal to the smallest CU size defined in a sequence parameter set (SPS).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes encoded video data. For example, the bitstream may comprise a sequence of bits that forms a representation of coded pictures of the video data and associated data. Thus, the bitstream comprises an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Figure 2:
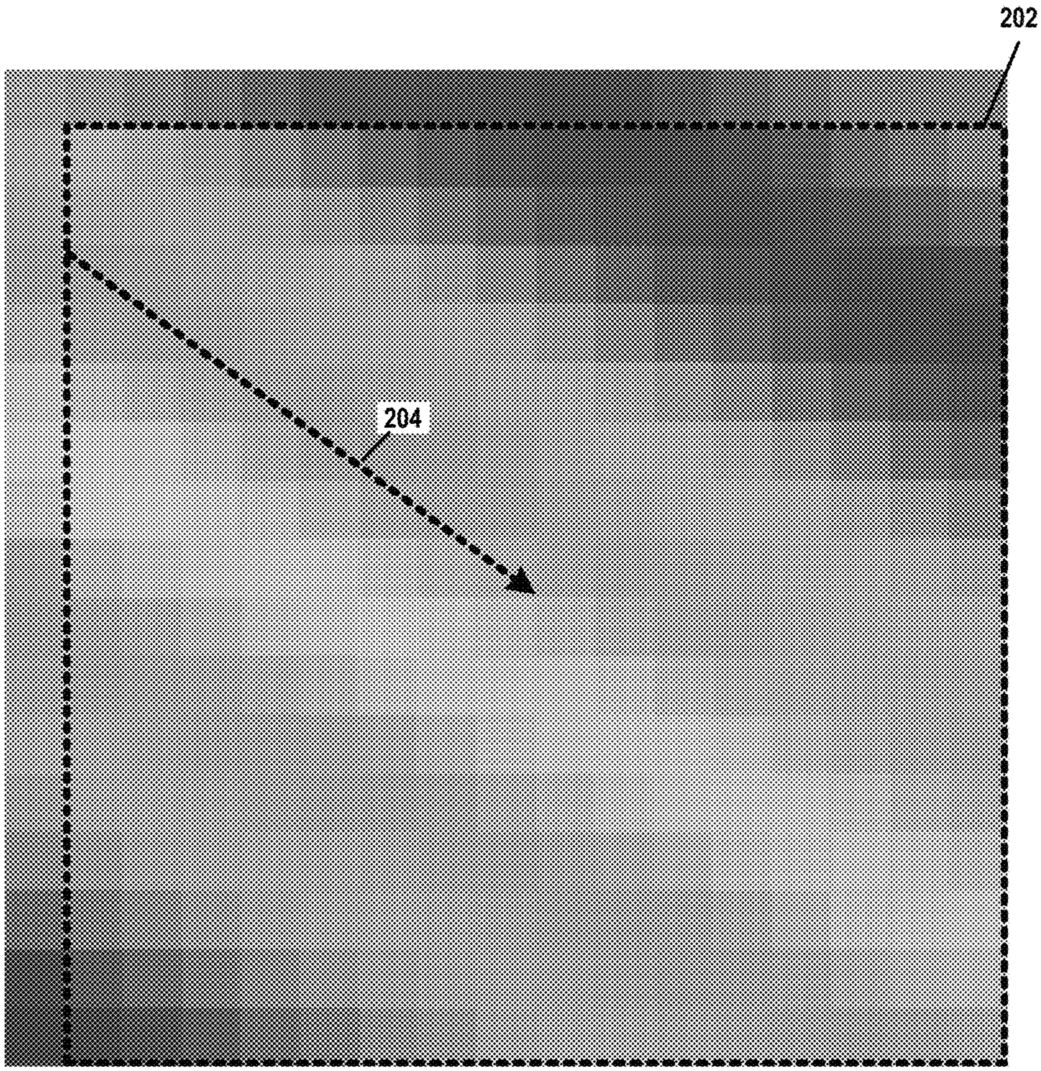
FIG. 2 is an example of intra prediction for a 16×16 block.

Intra prediction is discussed below. In some examples, intra prediction modes may be defined in HEVC and/or in one or more of HEVC's extensions. Video encoder 20 and/or video decoder 30 may perform image block prediction using spatially neighboring reconstructed image samples. An example of the intra prediction for a 16×16 image block is shown in FIG. 2. In the example, video encoder 20 and/or video decoder 30 may predict a 16×16 image block (in square 202) by the above and left neighboring reconstructed samples (reference samples) along a selected prediction direction (as indicated by arrow 204).

Figure 3:
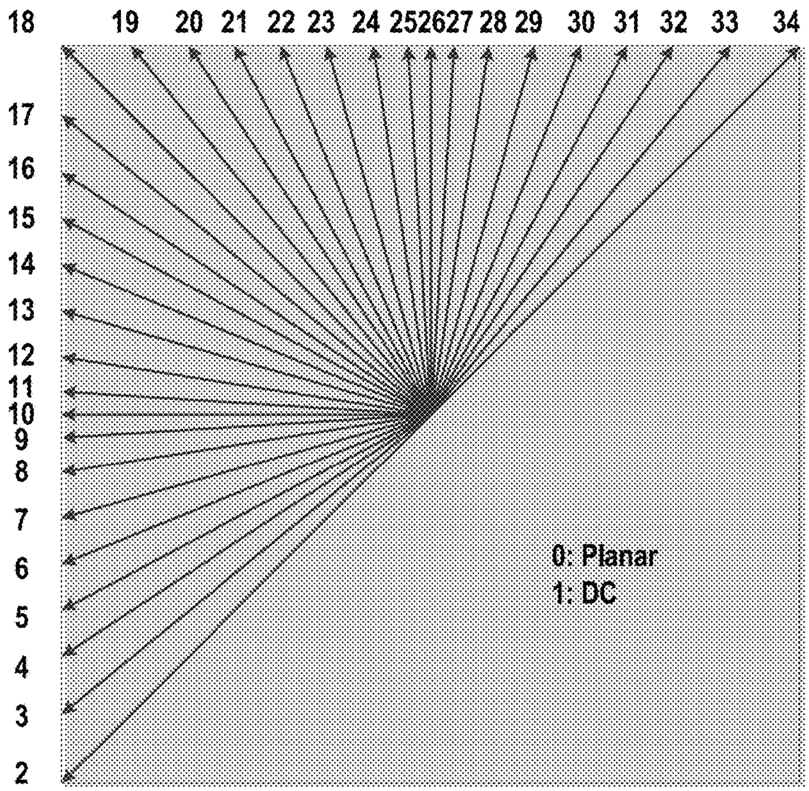
FIG. 3 is a conceptual diagram showing example intra prediction modes.

HEVC defines, for the intra prediction of a luma block, 35 modes, including the planar mode, DC mode and 33 angular modes, as illustrated in FIG. 3. The 35 modes of the intra prediction defined in HEVC are indexed in Table 1.

TABLE 1

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Figure 4:
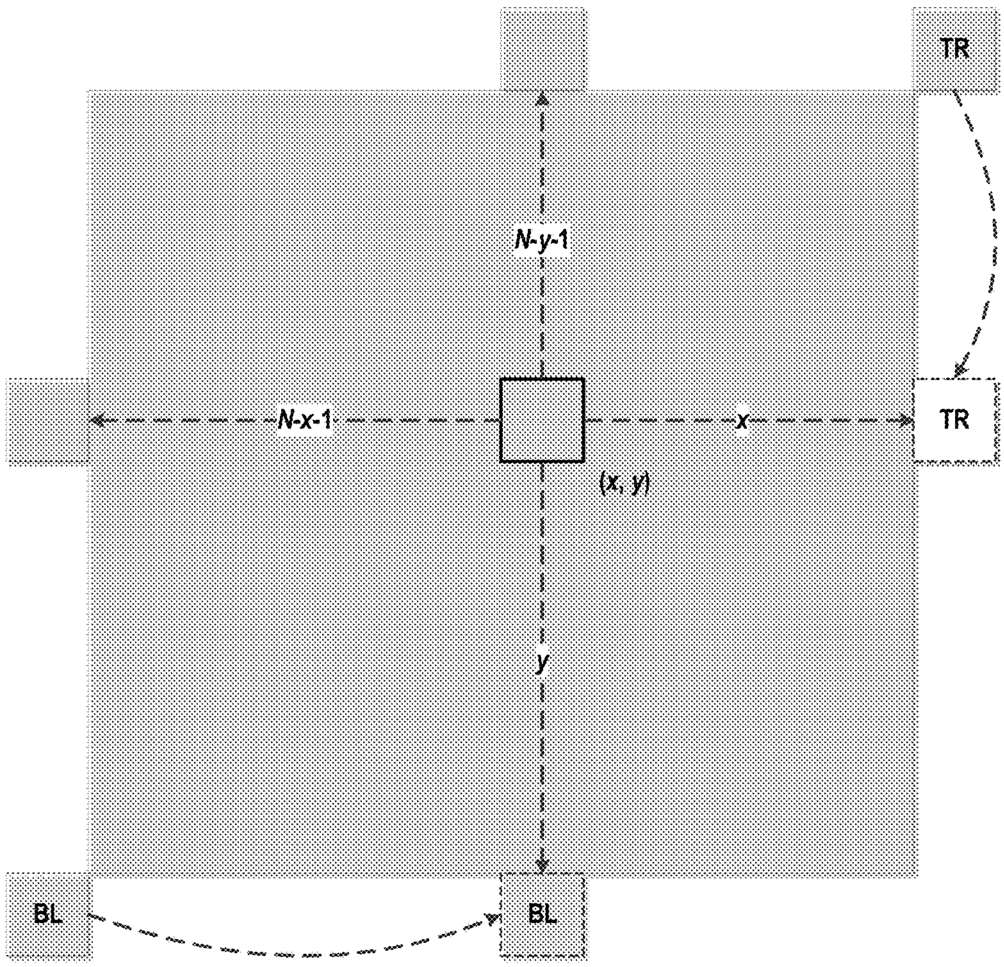
FIG. 4 is a conceptual diagram showing an example planar intra prediction mode.

For planar mode, which is typically the most frequently used intra prediction mode, the prediction sample is generated as shown in FIG. 4. To perform planar prediction for an N×N block, for each sample $p_{xy}$ located at (x, y), video encoder 20 and/or video decoder 30 may calculate the prediction information using four specific neighboring reconstructed samples, i.e., reference samples, with a bilinear filter. The four reference samples may include the top-right reconstructed sample TR, the bottom-left reconstructed sample BL, the two reconstructed samples located at the same column ($r_{x,-1}$) denoted by T and row ($r_{-1,y}$) denoted by L of the current sample. Video encoder 20 and/or video decoder 30 may formulate the planar mode as follows:

$$p_{xy}=(N-x-1)L+(N-y-1)\cdot T+x\cdot TR+y\cdot BL$$

As shown in FIG. 4, for DC mode, video encoder 20 and/or video decoder 30 may fill the prediction block with an average value of one or more neighboring reconstructed samples. Generally, video encoder 20 and/or video decoder 30 may apply both planar and DC modes for modeling smoothly varying and constant image regions.

Figure 5:
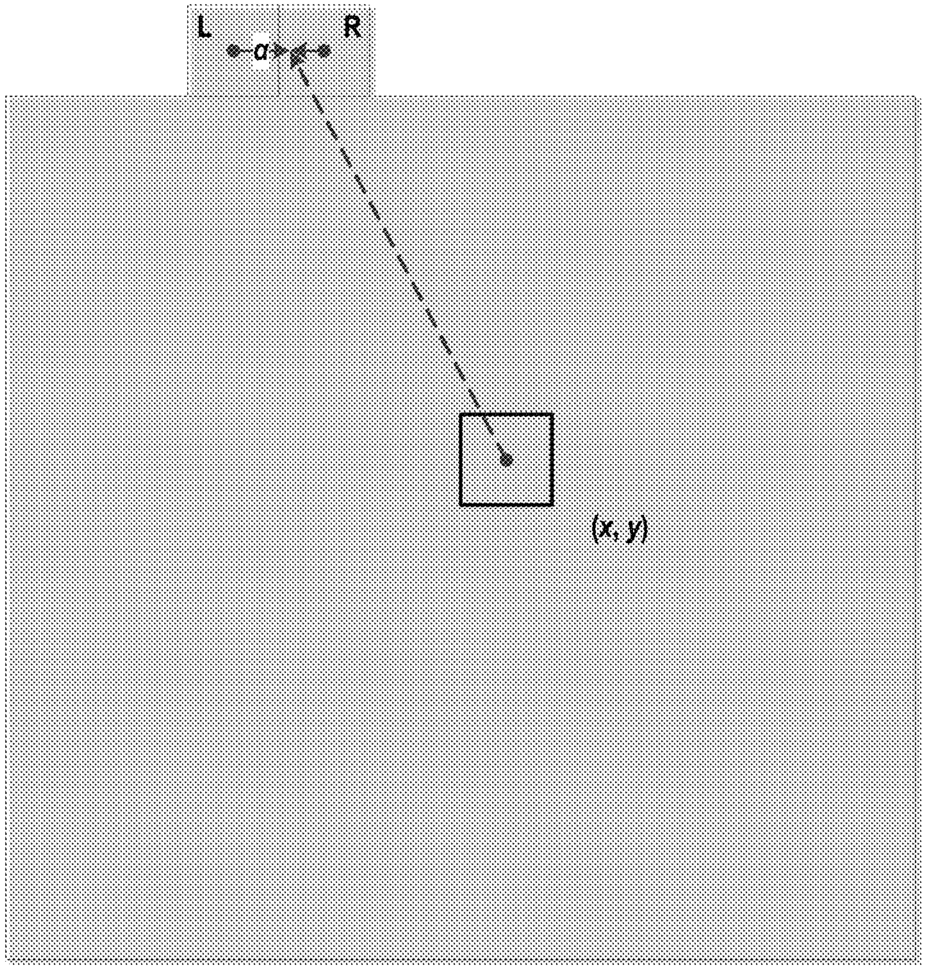
FIG. 5 is a conceptual diagram showing an example of bilinear interpolation based on an angular prediction mode.

For angular intra prediction modes in HEVC, which include totally 33 different prediction directions, the intra prediction process is described below. For each given angular intra prediction, video encoder 20 and/or video decoder 30 may identify the intra prediction direction accordingly. For instance, according to FIG. 3, intra mode 10 corresponds to a pure horizontal prediction direction, and intra mode 26 corresponds to a pure vertical prediction direction. Given a specific intra prediction direction, video encoder 20 and/or video decoder 30 may project, for each sample of the prediction block, a respective coordinate (x, y) to a row and/or column of neighboring reconstructed samples along the prediction direction, as shown in an example in FIG. 5. Suppose, (x,y) is projected to the fractional position a between two neighboring reconstructed samples L and R, then video encoder 20 and/or video decoder 30 may calculate the prediction information for (x, y) using a two-tap bi-linear interpolation filter, formulated as follows:

$$p_{xy}=(1-\alpha)L+\alpha\cdot R.$$

To avoid floating point operations, in HEVC, video encoder 20 and/or video decoder 30 may approximate the above calculation using integer arithmetic as follows.

$$p_{xy}=((32-a)\cdot L+a\cdot R+16)>>5,$$

In the above equation, a is an integer equal to 32*α.

Figure 6:
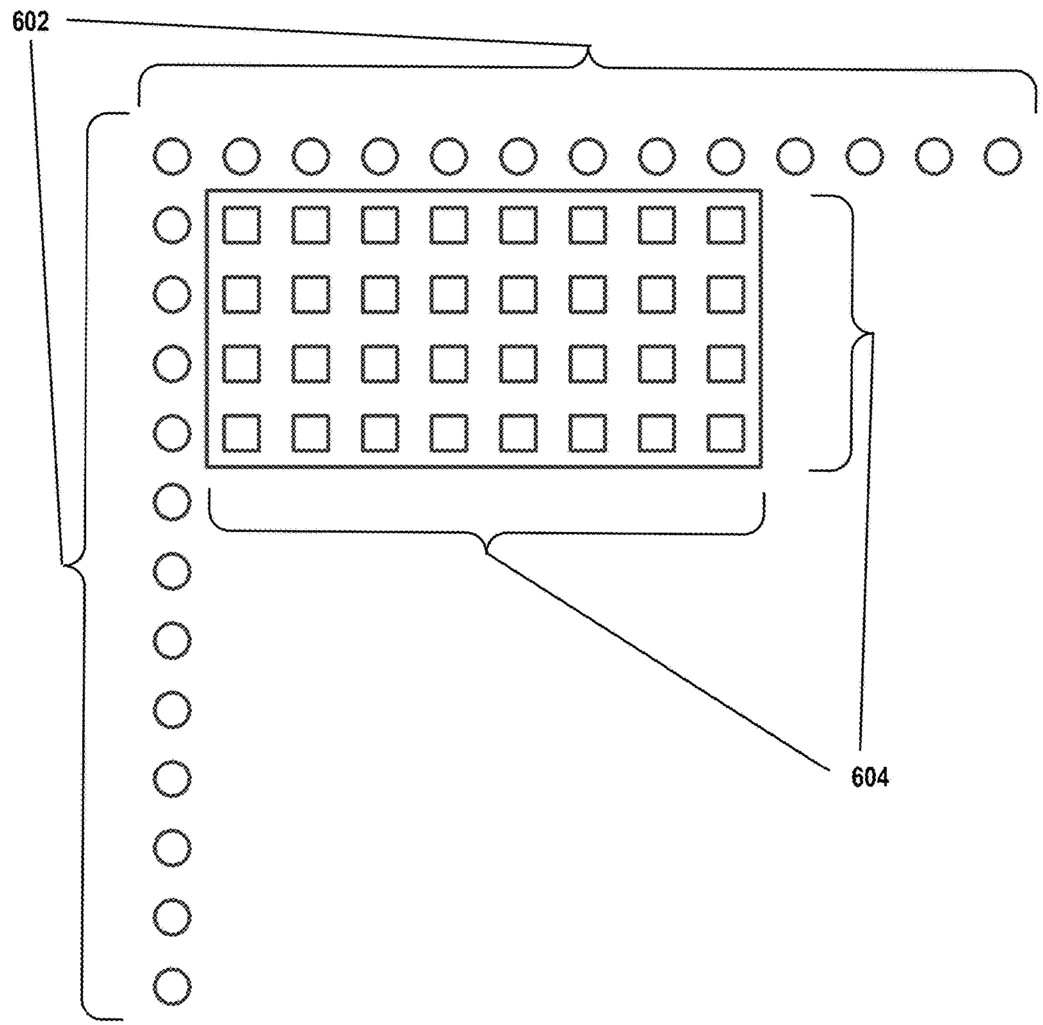
FIG. 6 is a conceptual diagram showing example reference samples used in intra prediction.

The reference samples used in HEVC are shown in FIG. 6 by the sample circles 602. As shown in FIG. 6, the samples of the video block being coded are indicated by squares 604. In contrast, circles 602 indicate neighboring reference samples. As used herein, a sample may refer to a component of a pixel value (e.g., the luma sample or one of the two chroma samples).

In some examples, for a H×W block, video encoder 20 and/or video decoder 30 may use, for both the neighboring top row and left column, W+H+1 reference samples. In the example, video encoder 20 and/or video decoder 30 may fill the reference samples into a reference sample buffer, which may contain totally 2*(W+H)+1 reference samples. According to the definition of 35 angular modes, the reference samples may be from sample circles 602, which means the reference samples are available. In some examples, video encoder 20 and/or video decoder 30 may derive the reference samples from neighboring reconstructed reference samples. For instance, when part of the reconstructed reference samples are not available, video encoder 20 and/or video decoder 30 may pad the part of the reconstructed reference samples that are not available (e.g., directly copy) using neighboring available reconstructed reference samples.

Figure 7:
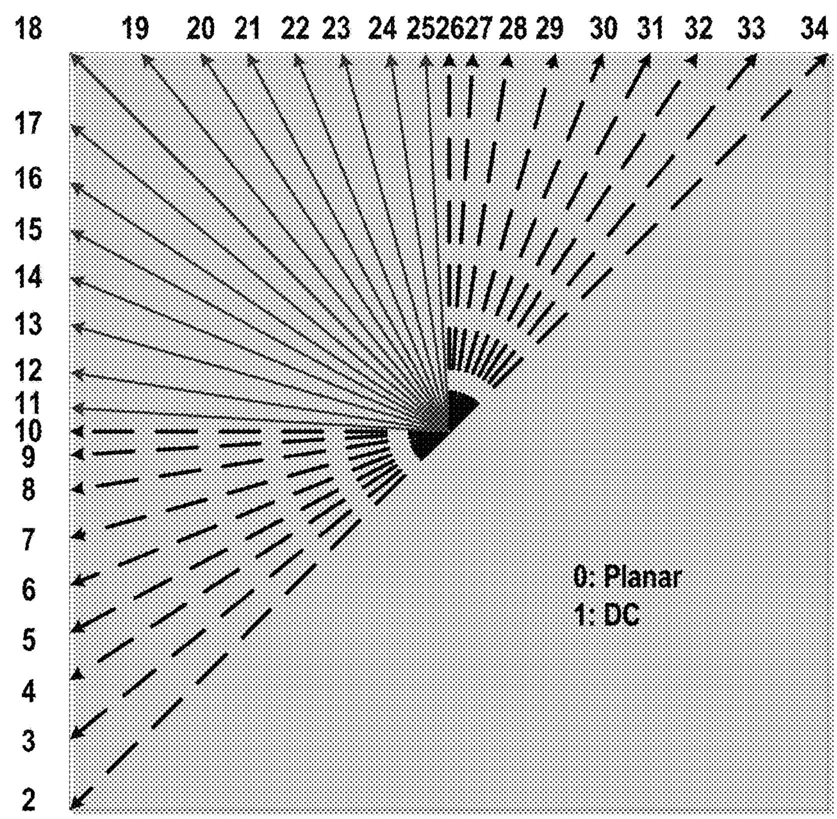
FIG. 7 is a conceptual diagram showing example positive and negative prediction directions for angular intra prediction.

In addition, the 33 angular intra prediction directions in HEVC may be classified as two groups, one is positive directions, and the other is negative directions. For positive directions (e.g., modes 2-10 and modes 26-34 in FIG. 7), video encoder 20 and/or video decoder 30 may use only one side of reference samples (e.g., either the top row or the left column). For negative directions (e.g., modes 11-25 in FIG. 7), video encoder 20 and/or video decoder 30 may use both sides (e.g., both the top row and left column) of reference samples. FIG. 7 illustrates the negative directions using non-dashed lines and the positive directions using dashed lines.

Figure 8:
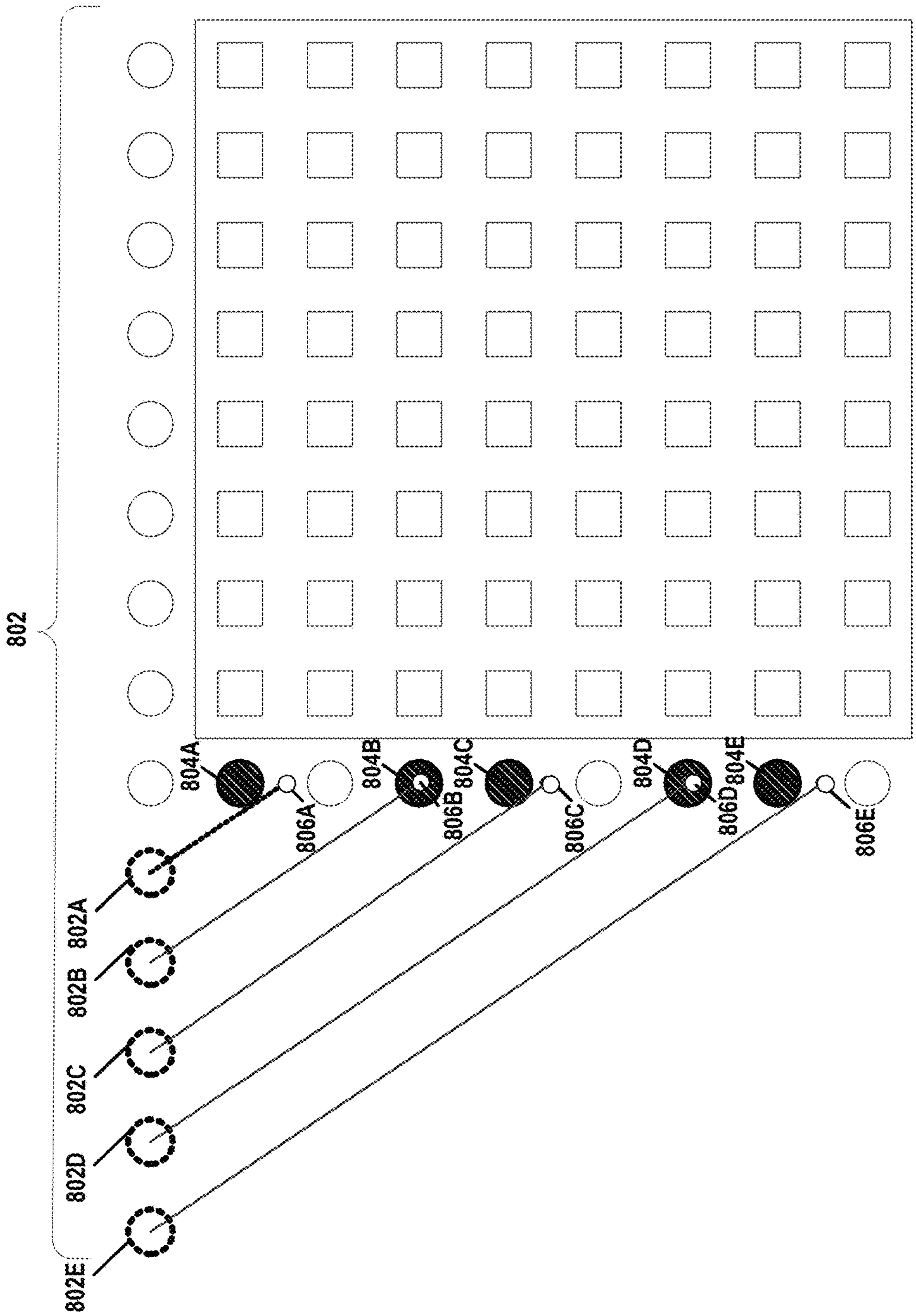
FIG. 8 is a conceptual diagram showing an example reference sample mapping process for angular intra prediction.

When video encoder 20 and/or video decoder 30 apply negative prediction direction, in HEVC, a reference mapping process may be applied as described below. As shown in FIG. 8, according to the intra prediction direction, video encoder 20 and/or video decoder 30 may derive extended reference samples 802A-802E (collectively, extended reference samples 802) extended to the left side of top row using the left-column neighboring samples 804A-804E. For example, video encoder 20 and/or video decoder 30 may derive sample 802A using left-column neighboring sample 804A, sample 802B using left-column neighboring sample 804B, and so forth. Video encoder 20 and/or video decoder 30 may perform the intra prediction process using all the reference samples 802.

More specifically, to derive extended reference samples 802, for each extended reference sample of extended reference samples 802, video encoder 20 and/or video decoder 30 may map the coordinate to the left-column neighboring samples. For example, video encoder 20 and/or video decoder 30 may map extended reference sample 802A to coordinate 806A, extended reference sample 802B to coordinate 806B, extended reference sample 802C to coordinate 806C, extended reference sample 802D to coordinate 806D, and extended reference sample 802E to coordinate 806E. In the example, video encoder 20 and/or video decoder 30 may use the value of nearest sample as the value of the current extended reference sample. For example, video encoder 20 and/or video decoder 30 may use sample 804A as the value of extended reference sample 802A when coordinate 806A is closer to sample 804A than samples 804B-804E. In some cases, however, the mapped position may indicate a fractional position lies in the left-column neighboring samples, and using the nearest sample may present some prediction error along the prediction direction. Said differently, for example, coordinate 806A indicates a fraction position that lies between extended reference samples 804A and 804B, which may result in prediction error in extended reference sample 802A when a value of sample 804A is used as the value of extended reference sample 802A.

Intra prediction modes in JEM is discussed in the following. Recently, ITU-T VCEG (Q6/16) and ISO/IEC MPEG (JTC 1/SC 29/WG 11) have been studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A test model, namely Joint Exploration Model, has been developed for this purpose by JVET, a description on the new algorithms in latest JEM version, i.e., JEM-3.0, is available from: http://phenix.it-sudparis.eu/jvet/doc_end_user/documents/3_Geneva/wg11/JVET-C1001-v3.zip. The above document describes the coding features that are under coordinated test model study by the Joint Video Exploration Team (JVET) of ITU-T VCEG and ISO/IEC MPEG as potential enhanced video coding technology beyond the capabilities of HEVC. Information may be also obtained at "HM reference software,", https://hevc.hhi.fraunhofer.de/svn/svn_HEVCSoftware/tags/HM-14.0/.

Figure 9:
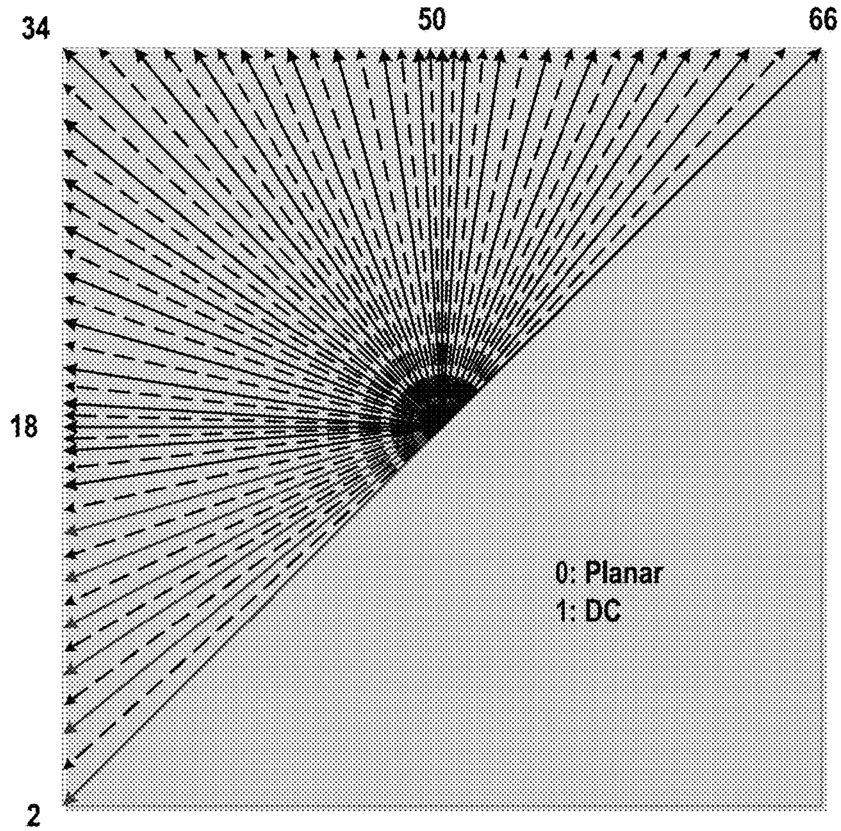
FIG. 9 is a conceptual diagram showing other example intra prediction modes.

Extended intra prediction directions are discussed below. One intra related coding tool in JEM-3.0 is the introduction of 67 intra prediction modes, as shown in FIG. 9. Compared to the intra prediction modes in HEVC, 32 additional intra prediction angles, as shown by the dashed arrows in FIG. 9. Intra mode index 0 and 1 refer to the same planar and DC modes in HEVC, intra mode index 2~66 refer to different intra prediction angles, while 18, 34, and 50 indicates pure horizontal prediction, diagonal prediction and pure vertical prediction, respectively. With 67 intra prediction modes, finer intra prediction accuracy may be achieved.

Four-tap interpolation filters for intra prediction is discussed below. For generating the intra prediction block, instead of using 2-tap bilinear interpolation, in JEM-3.0, video encoder 20 and/or video decoder 30 may use 4-tap interpolation filters with 1/32 pel accuracy. As used herein, 1/32 pel refers to using 1/32 of a distance between samples. For vertical-like angular intra prediction directions (e.g., intra mode index>=34), if the block width is larger than 8, video encoder 20 and/or video decoder 30 may use a 4-tap Gaussian interpolation filter. Otherwise, video encoder 20 and/or video decoder 30 may use a 4-tap cubic interpolation filter. For horizontal-like angular intra prediction directions (e.g., intra mode index<34), if the block height is larger than 6, video encoder 20 and/or video decoder 30 may use a 4-tap Gaussian interpolation filter. Otherwise, video encoder 20 and/or video decoder 30 may use a 4-tap cubic interpolation filter. Exemplary, 4-tap cubic interpolation and 4-tap Gaussian interpolation filters are shown below:

```
Short g_aiIntraCubicFilter[32][4] =
{
 { 0, 256, 0, 0 }, // integer position
 { −3, 252, 8, −1 }, // 1/32 position
 { −5, 247, 17, −3 }, // 2/32 position
 { −7, 242, 25, −4 }, // 3/32 position
 { −9, 236, 34, −5 }, // 4/32 position
 { −10, 230, 43, −7 }, // 5/32 position
 { −12, 224, 52, −8 }, // 6/32 position
 { −13, 217, 61, −9 }, // 7/32 position
 { −14, 210, 70, −10 }, // 8/32 position
 { −15, 203, 79, −11 }, // 9/32 position
 { −16, 195, 89, −12 }, // 10/32 position
 { −16, 187, 98, −13 }, // 11/32 position
 { −16, 179, 107, −14 }, // 12/32 position
 { −16, 170, 116, −14 }, // 13/32 position
 { −17, 162, 126, −15 }, // 14/32 position
 { −16, 153, 135, −16 }, // 15/32 position
 { −16, 144, 144, −16 }, // half-pel position
 { −16, 135, 153, −16 }, // 17/32 position
 { −15, 126, 162, −17 }, // 18/32 position
 { −14, 116, 170, −16 }, // 19/32 position
 { −14, 107, 179, −16 }, // 20/32 position
 { −13, 98, 187, −16 }, // 21/32 position
 { −12, 89, 195, −16 }, // 22/32 position
 { −11, 79, 203, −15 }, // 23/32 position
 { −10, 70, 210, −14 }, // 24/32 position
 { −9, 61, 217, −13 }, // 25/32 position
 { −8, 52, 224, −12 }, // 26/32 position
 { −7, 43, 230, −10 }, // 27/32 position
```

-continued

```
  { -5, 34, 236, -9 }, // 28/32 position
  { -4, 25, 242, -7 }, // 29/32 position
  { -3, 17, 247, -5 }, // 30/32 position
  { -1, 8, 252, -3 }, // 31/32 position
};
Short g_aiIntraGaussFilter[32][4] =
{
  { 47, 161, 47, 1 }, // integer position
  { 43, 161, 51, 1 }, // 1/32 position
  { 40, 160, 54, 2 }, // 2/32 position
  { 37, 159, 58, 2 }, // 3/32 position
  { 34, 158, 62, 2 }, // 4/32 position
  { 31, 156, 67, 2 }, // 5/32 position
  { 28, 154, 71, 3 }, // 6/32 position
  { 26, 151, 76, 3 }, // 7/32 position
  { 23, 149, 80, 4 }, // 8/32 position
  { 21, 146, 85, 4 }, // 9/32 position
  { 19, 142, 90, 5 }, // 10/32 position
  { 17, 139, 94, 6 }, // 11/32 position
  { 16, 135, 99, 6 }, // 12/32 position
  { 14, 131, 104, 7 }, // 13/32 position
  { 13, 127, 108, 8 }, // 14/32 position
  { 11, 123, 113, 9 }, // 15/32 position
  { 10, 118, 118, 10 }, // half-pel position
  { 9, 113, 123, 11 }, // 17/32 position
  { 8, 108, 127, 13 }, // 18/32 position
  { 7, 104, 131, 14 }, // 19/32 position
  { 6, 99, 135, 16 }, // 20/32 position
  { 6, 94, 139, 17 }, // 21/32 position
  { 5, 90, 142, 19 }, // 22/32 position
  { 4, 85, 146, 21 }, // 23/32 position
  { 4, 80, 149, 23 }, // 24/32 position
  { 3, 76, 151, 26 }, // 25/32 position
  { 3, 71, 154, 28 }, // 26/32 position
  { 2, 67, 156, 31 }, // 27/32 position
  { 2, 62, 158, 34 }, // 28/32 position
  { 2, 58, 159, 37 }, // 29/32 position
  { 2, 54, 160, 40 }, // 30/32 position
  { 1, 51, 161, 43 }, // 31/32 position
};
```

Figure 10:
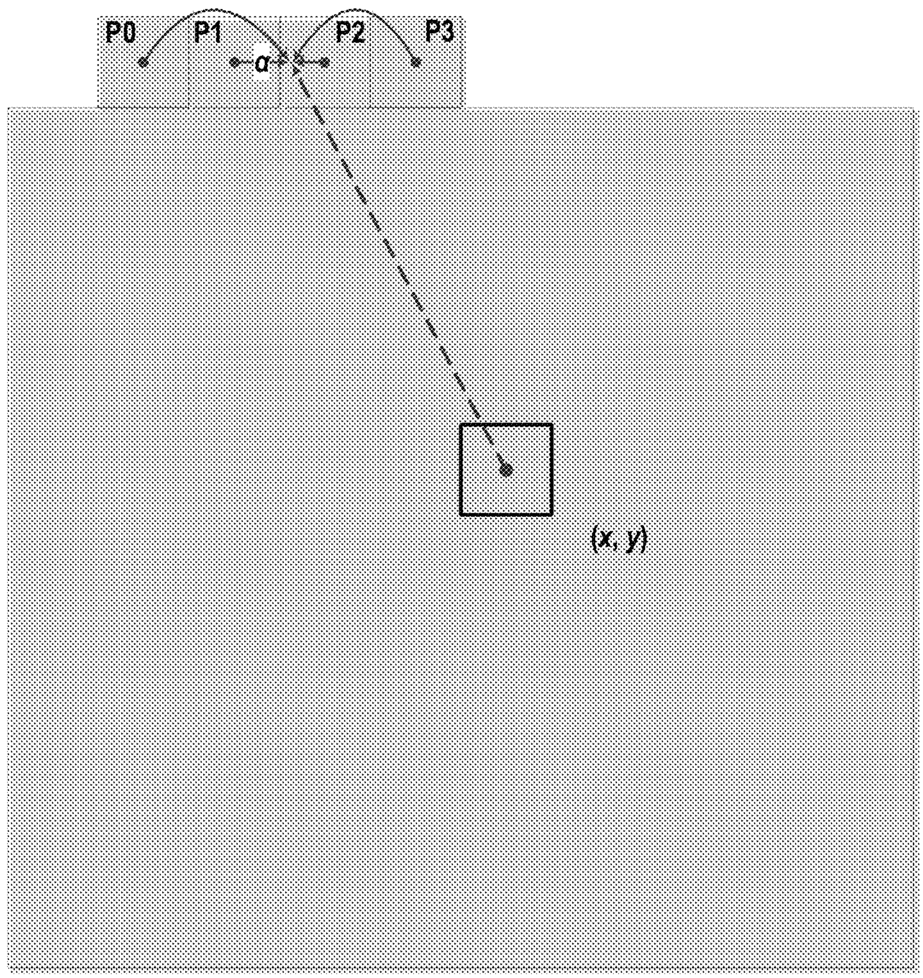
FIG. 10 is a conceptual diagram showing an example 4-tap interpolation based on an angular prediction mode.

The intra prediction process using a 4-tap interpolation process is depicted in FIG. 10. In the example of FIG. 10, for each sample in the prediction block, video encoder 20 and/or video decoder 30 may assume a respective sample in the prediction block is pointing to a fractional position a between two reference samples P1 and P2. In the example, video encoder 20 and/or video decoder 30 may calculate the prediction information for this sample as follows.

In some examples, given the fractional position a and interpolation filters (e.g., 4-tap cubic or 4-tap Gaussian filters), video encoder 20 and/or video decoder 30 may select the filter coefficients as f0, f1, f2, f3. In the example, video encoder 20 and/or video decoder 30 may calculate the prediction information for this sample as follows.

$$P(x,y)=(f0*P0+f1*P1+f2*P2+f3*P3+r)/W.$$

In the above equation, P0-P3 are reference samples, r is a rounding offset, W is a normalization factor, which should be close to f0+f1+f2+f3. In the above, given 4-tap Cubic and Gaussian filters, the normalization factor may be 256.

Figure 11:
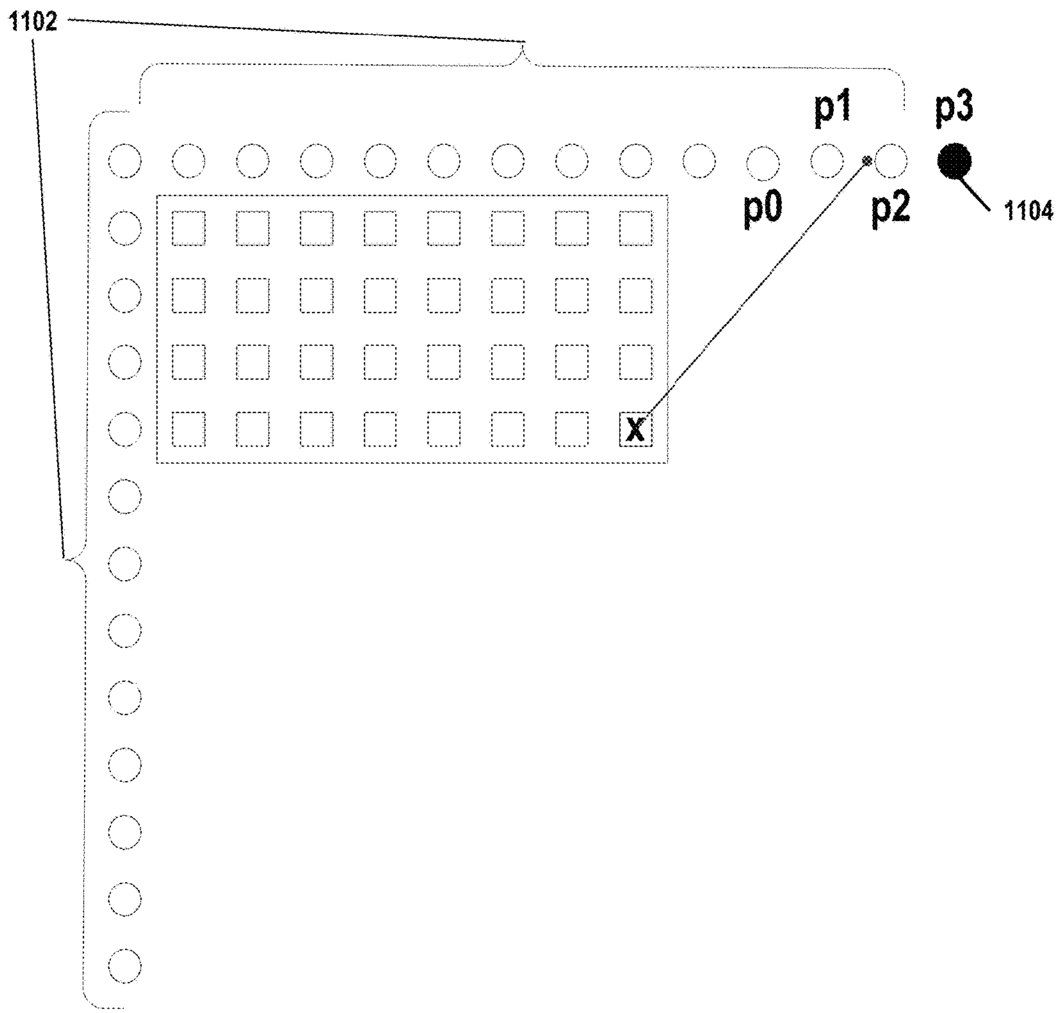
FIG. 11 is a conceptual diagram showing an example 4-tap interpolation at a boundary location.

In the current 4-tap interpolation filter design in JEM, for some boundary cases, the reference samples at some filter tap may be not available. For example, as shown in FIG. 11, given the intra prediction angle denoted by the arrow, for generating the prediction information of sample x using a four tap filter {f0, f1, f2, f3}, video encoder 20 and/or video decoder 30 may use the reference samples p0, p1, p2 and p3. However, according to the current JEM design, only reference samples 1102 are available in the reference sample buffer, and the right most one (p3, denoted by filled circle 1104) is not available. In this case, video encoder 20 and/or video decoder 30 may perform a clipping operation on the reference sample coordinates, such that only p0~p2 are used in the interpolation process, for instance, using the below equation.

$$x=f0*p0+f1*p1+f2*p2+f3*p2.$$

In some examples, video encoder 20 and/or video decoder 30 may use a clipping operation during the interpolation process to avoid accessing any sample outside the range of reference sample buffer. However, this may add complexity of performing N-tap interpolation filter while N>2. For two-tap interpolation filter as used in HEVC, such problems do not exist since only the reference samples 1102 are used.

Figure 12B:
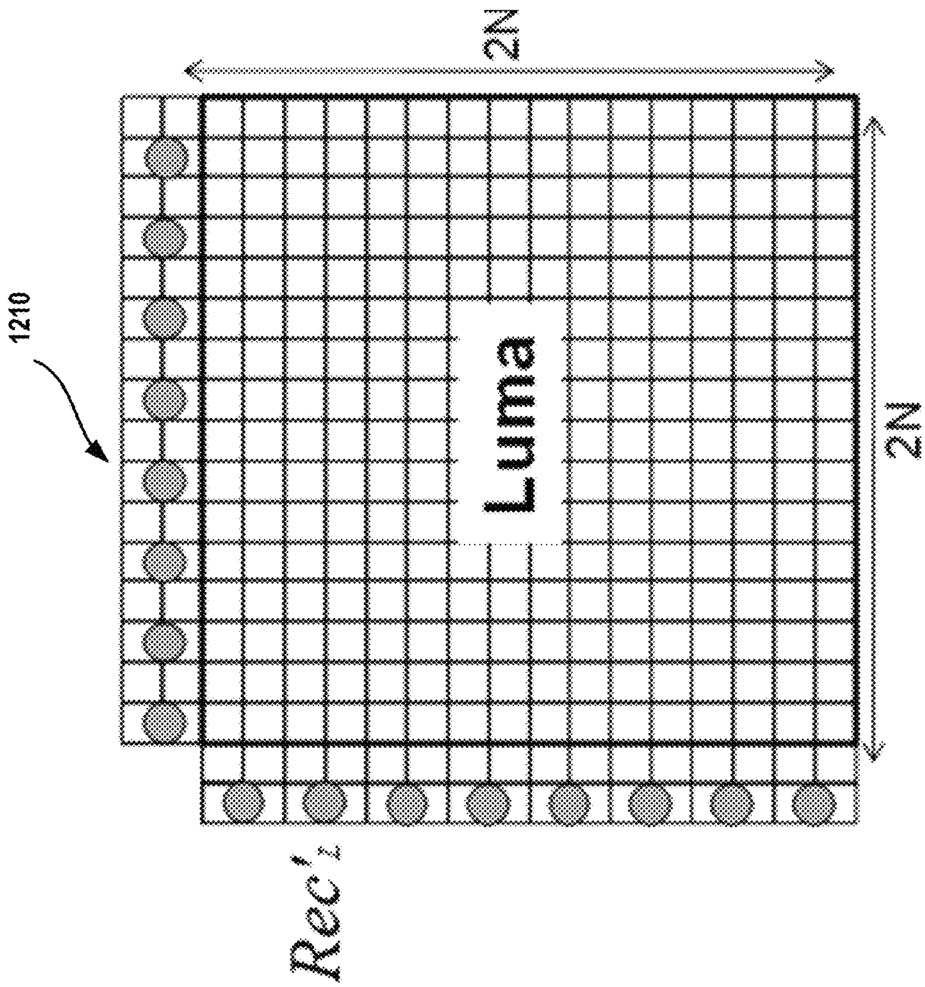
FIG. 12B is a conceptual diagram showing locations of luma samples used for a derivation of linear prediction parameters for cross-component linear prediction model prediction mode.
Figure 12A:
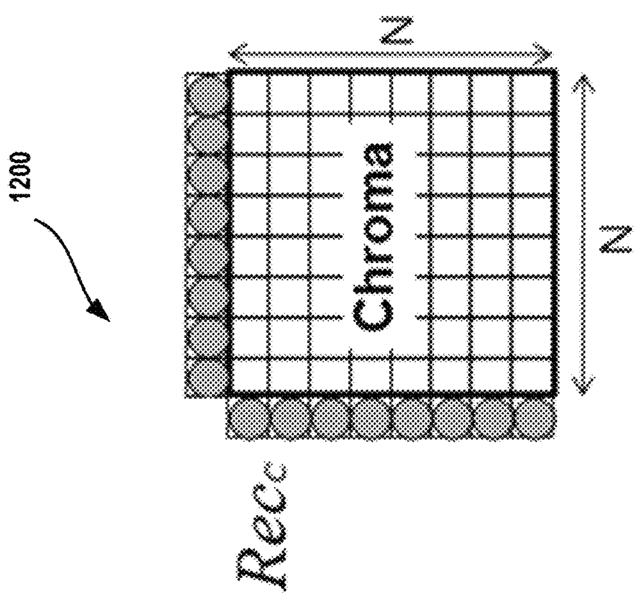
FIG. 12A is a conceptual diagram showing locations of chroma samples used for a derivation of linear prediction parameters for cross-component linear prediction model prediction mode.

FIG. 12A is a conceptual diagram showing locations of chroma samples used for a derivation of linear prediction parameters for cross-component linear prediction model prediction mode. FIG. 12B is a conceptual diagram showing locations of luma samples used for a derivation of linear prediction parameters for cross-component linear prediction model prediction mode.

Cross-component linear model prediction mode is discussed in the following. Although the cross complement redundancy is significantly reduced in YCbCr color space, correlation between three color components may still exist. Various methods have been studied to improve the video coding performance by further reduce the correlation.

In 4:2:0 chroma video coding, a method named Linear Model (LM) prediction mode has been well studied, during development of HEVC standard. For example, Matsuo, Shohei, Seishi Takamura, and Hirohisa Jozawa, "Improved intra angular prediction by DCT-based interpolation filter." In *Signal Processing Conference* (*EUSIPCO*), 2012 *Proceedings of the* 20*th European*, pp. 1568-1572. IEEE, 2012 provides an example intra angular prediction.

With LM prediction mode, video encoder 20 and/or video decoder 30 may predict chroma samples based on reconstructed luma samples of the same block by using a linear model as follows:

$$pred_C(i,j)=\alpha\cdot rec_L(i,j)+\beta$$

In the above equation, $pred_C(i, j)$ represents the prediction of chroma samples in a block and $rec_L(i, j)$ represents the down sampled reconstructed luma samples of the same block. In some examples, video encoder 20 and/or video decoder 30 may derive linear parameters α and β from causal reconstructed samples around the current block. In some examples, parameters α and β are linear prediction parameters for cross-component linear prediction model prediction mode. In the example of FIG. 12A, chroma block 1200 has a size of N×N. As such, in this example, both i and j may be within the range [0, N].

Video encoder 20 and/or video decoder 30 may derive parameters α and β in the above equation by minimizing regression error between the neighboring reconstructed luma and chroma samples around the current block.

$$E(\alpha,\beta)=\sum_i (y_i-(\alpha\cdot x_i+\beta))^2$$

Video encoder 20 and/or video decoder 30 may solve the parameters α and β as follows.

$$\alpha=\frac{I\sum x_i\cdot y_i-\sum x_i\cdot\sum y_i}{I\sum x_i\cdot x_i-\sum x_i\cdot\sum x_i}$$

$$\beta=\left(\sum y_i-\alpha\cdot\sum x_i\right)/I$$

In the above equation, $x_i$ is down sampled reconstructed Luma reference sample, $y_i$ is reconstructed chroma reference samples, and I is amount of the reference samples. For a target N×N chroma block, when both left and above causal samples are available, the total involved reference samples number I is equal to 2N. In the example of FIG. 12B, luma block 1210 has a size of 2N×2N for target chroma block 1200 of FIG. 12A. When only left or above causal samples are available, the total involved reference samples number I is equal to N.

In summary, in one example, when video encoder 20 and/or video decoder 30 applies LM prediction mode, the following steps may be invoked in order: (a) video encoder 20 and/or video decoder 30 may down sample neighboring luma samples; (b) video encoder 20 and/or video decoder 30 may derive linear parameters (i.e., $\alpha$ and $\beta$); and (c) video encoder 20 and/or video decoder 30 may down sample the current luma block and derive the prediction from the down sampled luma block and linear parameters.

In the current JEM design, video encoder 20 and/or video decoder 30 may use 4-tap interpolation filters, but using longer-tap filters may further improve the coding performance of video encoder 20 and/or video decoder 30 without much complexity burden.

For some boundary cases, video encoder 20 and/or video decoder 30 may access some reference sample position that is out of the range of current reference samples (e.g., sample circles 602 in FIG. 6, p3 denoted by filled circle 1104 of FIG. 11, etc.), and a clipping operation may be used to avoid accessing unknown memory. In the example, the clipping operation may add to a complexity of the 4-tap interpolation filtering techniques.

In the current example intra prediction processes in both HEVC and JEM, the intra reference sample mapping process is performed by the rounding operation (e.g., identical to nearest integer) which inevitably gives some prediction error.

Matsuo, Shohei, Seishi Takamura, and Hirohisa Jozawa, "Improved intra angular prediction by DCT-based interpolation filter," In *Signal Processing Conference* (*EUSIPCO*), 2012 *Proceedings of the* 20*th European*, pp. 1568-1572. IEEE, 2012, proposes to apply a 4-tap DCT based interpolation filter for 4×4 and 8×8 block sizes and the intra smoothing filter is also turned off when 4-tap filter is applied, for block sizes larger than or equal to 16×16, the 2-tap bilinear interpolation filter is applied.

In Maani, Ehsan, "Interpolation filter for intra prediction of HEVC," U.S. patent application Ser. No. 13/312,946, filed Dec. 6, 2011, a 4-tap interpolation filter can be used when the intra smoothing filter is off, while the 4-tap interpolation filter could be obtained based on a CUBIC interpolation process, a DCT-based interpolation process or a Hermite interpolation process.

In Zhao, "Intra Prediction and Intra Mode Coding." U.S. patent application Ser. No. 15/184,033, filed Jun. 16, 2016, a 4-tap CUBIC interpolation filter and a 4-tap Gaussian interpolation filter are used jointly for intra prediction process.

To help resolve the problems mentioned above, following techniques are proposed. The following itemized techniques may be applied individually. Alternatively, or additionally, any combination of the below described techniques may be used together.

In some examples, video encoder 20 and/or video decoder 30 may apply multiple interpolation filters for intra prediction. For example, video encoder 20 and/or video decoder 30 may apply different interpolation filter taps (e.g., length) within one block, slice, tile, picture, or combination thereof. Said differently, video decoder 30 may apply a first interpolation filter to a first portion of a picture and apply a second interpolation filter to a second portion of a picture that is different from the first interpolation filter. Similarly, video encoder 20 may apply a first interpolation filter to a first portion of a picture and apply a second interpolation filter to a second portion of a picture that is different from the first interpolation filter.

In some examples, video encoder 20 and/or video decoder 30 may define the interpolation filter as a sextic filter. As used herein, sextic filter may refer to an interpolation filter having an interpolation filter tap of 6.

In some examples, the multiple interpolation filters may include a DCT based interpolation filter, a Gaussian filter, a sinc interpolation filter, and an interpolation filter derived using an image correlation model.

Video encoder 20 and/or video decoder 30 may select an interpolation filter type and/or the interpolation filter tap (e.g., length) based on a block height and/or width, block shape (e.g., the ratio of width versus height), block area size, intra prediction modes, or neighboring decoded information, including but not limited to the reconstructed sample values and intra prediction modes. For example, video encoder 20 and/or video decoder 30 may select an interpolation filter type based on block height and/or width, block shape (e.g., the ratio of width versus height), block area size, intra prediction modes, or neighboring decoded information, including but not limited to the reconstructed sample values and intra prediction modes. For instance, video encoder 20 and/or video decoder 30 may select an interpolation filter tap length based on block height and/or width, block shape (e.g., the ratio of width versus height), block area size, intra prediction modes, or neighboring decoded information, including but not limited to the reconstructed sample values and intra prediction modes.

Said differently, video decoder 30 may select an interpolation filter from multiple interpolation filters based on the block of video data. Similarly, video encoder 20 may select an interpolation filter from multiple interpolation filters based on the block of video data.

In some examples, 2 different types of interpolation filters may be pre-defined, namely filter 'A' and filter 'B'. In this example, if a width/height<¼ or a width/height>¼, then video encoder 20 and/or video decoder 30 apply filter 'A', otherwise, video encoder 20 and/or video decoder 30 apply filter 'B.' Said differently, video encoder 20 and/or video decoder 30 may select a first interpolation filter from a plurality of interpolation filters for a block when a width-to-height ratio of the block is within a pre-defined range. In this example, video encoder 20 and/or video decoder 30 may select a second interpolation filter from the plurality of interpolation filters for the block when the width-to-height ratio of the block is not within the pre-defined range.

In some examples, 2 different types of interpolation filters may be pre-defined, namely filter 'A' and filter 'B.' In this example, video encoder 20 and/or video decoder 30 calculate a variance of the neighboring (e.g., top and/or left) reconstructed samples as σ2. In this example, if σ2 is less than a pre-defined threshold value T, then video encoder 20 and/or video decoder 30 applies filter 'A', otherwise, video encoder 20 and/or video decoder 30 applies filter 'B'. Said differently, video encoder 20 and/or video decoder 30 may select a first interpolation filter from a plurality of interpolation filters for a block when a variance of neighboring reconstructed samples for the block is less than a pre-defined value. In this example, video encoder 20 and/or video decoder 30 may select a second interpolation filter from the plurality of interpolation filters for the block when the variance is not less than the pre-defined value.

In some examples, several different types of interpolation filters are pre-defined, given the intra prediction direction. In this example, video encoder 20 and/or video decoder 30 select one of the several pre-defined interpolation filters according to a pre-defined look-up table. Said differently, video encoder 20 and/or video decoder 30 may select a particular interpolation filter from a plurality of interpolation filters for a block when a look-up table associates the particular interpolation filter to an intra prediction direction for the block.

For example, when an intra prediction is vertical-like intra predictions (e.g., modes 18-34 for HEVC, modes 34-66 for JEM-3.0, etc.), video encoder 20 and/or video decoder 30 may use a width of a block to select interpolation filter and/or number of interpolation filter taps (e.g., filter tap length). In this example, if the width is less than or equal to a certain size, for example 8, video encoder 20 and/or video decoder 30 may use a 6-tap sextic interpolation filter. Otherwise, in this example, video encoder 20 and/or video decoder 30 may use a 4-tap Gaussian interpolation filter.

Similarly, for example, when an intra prediction is horizontal-like intra predictions (e.g., modes 2-17 for HEVC, modes 2-33 for JEM-3.0, etc.), video encoder 20 and/or video decoder 30 may use a height of a block to select interpolation filter and/or number of interpolation filter taps (e.g., filter tap length). In this example, if the height is less than or equal to a certain size, for example 8, video encoder 20 and/or video decoder 30 may use a 6-tap sextic interpolation filter. Otherwise, in this example, video encoder 20 and/or video decoder 30 may use a 4-tap Gaussian interpolation filter.

In some examples, the interpolation filter type and/or the interpolation filter tap (e.g., length) may depend on whether the required reference sample is out of the reference sample buffer, e.g., unavailable. For instance, video encoder 20 and/or video decoder 30 may select an interpolation filter type based on whether the required reference sample is out of the reference sample buffer, e.g., unavailable. For instance, video encoder 20 and/or video decoder 30 may select an interpolation filter tap length based on whether the required reference sample is out of the reference sample buffer, e.g., unavailable.

In some examples, as in a current exemplary design, for the intra prediction of an M×N block, the reference sample buffer may contain 2*(M+N)+1 samples. For an intra prediction mode and a position within a block, the reference sample may not be located in a reference sample buffer. In the example, video encoder 20 and/or video decoder 30 may apply interpolation with a smaller filter tap length compared to other positions under the same intra prediction mode. For example, video decoder 30 may determine a set of reference samples from neighboring reconstructed reference samples. In this example, video decoder 30 may select an interpolation filter from multiple interpolation filters based on the block of video data. For example, video decoder 30 may select the interpolation filter having a largest filter tap length for a given set of reference samples located in the reference sample buffer.

Similarly, for example, video encoder 20 may determine a set of reference samples from neighboring reconstructed reference samples. In this example, video encoder 20 may select an interpolation filter from multiple interpolation filters based on the block of video data. For example, video encoder 20 may select the interpolation filter having a largest filter tap length for a given set of reference samples located in the reference sample buffer.

In some examples, when an intra prediction is vertical-like intra predictions, video encoder 20 and/or video decoder 30 may use a width of a block to select interpolation filter and/or number of interpolation filter taps (e.g., filter tap length). In the example, if the width is less than or equal to a certain size, for example 8, video encoder 20 and/or video decoder 30 may use a 6-tap sextic interpolation filter. In the example, if the width is not less than or equal to a certain size, video encoder 20 and/or video decoder 30 may use a 4-tap Gaussian interpolation filter. Additionally, or alternatively, when the intra prediction is horizontal-like intra predictions, video encoder 20 and/or video decoder 30 may use a height of a block to select interpolation filter and/or number of interpolation filter taps (e.g., filter tap length). In the example, if a width is less than or equal to a certain size, for example 8, video encoder 20 and/or video decoder 30 may use a 6-tap sextic interpolation filter. In the example, if a width is not less than or equal to the certain size, video encoder 20 and/or video decoder 30 may use a 4-tap Gaussian interpolation filter. The filter types can be, for example, smoothing, sharpening, interpolation, or any other filter type.

In some examples, when video encoder 20 and/or video decoder 30 applies the intra reference sample mapping process, e.g., for negative intra prediction directions, instead of using nearest neighboring reference to derive the values of extended reference samples, video encoder 20 and/or video decoder 30 may apply an N-tap interpolation filter to the neighboring reference samples to derive the value of each extended reference sample. For example, video decoder 30 may derive, using a first interpolation filter, a value for an extended reference sample based on the set of reference samples from neighboring reconstructed reference samples. Similarly, video encoder 20 may derive, using a first interpolation filter, a value for an extended reference sample based on the set of reference samples from neighboring reconstructed reference samples.

In some examples, video encoder 20 and/or video decoder 30 may apply a four-tap cubic interpolation filter to derive the extended reference sample value during an intra reference sample mapping process. For example, video decoder 30 may derive, using a four-tap cubic interpolation filter, a value for an extended reference sample based on the set of reference samples from neighboring reconstructed reference samples. Similarly, video encoder 20 may derive, using a four-tap cubic interpolation filter, a value for an extended reference sample based on the set of reference samples from neighboring reconstructed reference samples.

In some examples, when a portion of the reference samples is not available for the N-tap interpolation, video encoder 20 and/or video decoder 30 may perform a clipping operation on the reference sample location such that nearest available reference sample may be used for the N-tap interpolation. For example, for the intra reference sample mapping of a particular extended reference sample, if a 4-tap interpolation filter {f0, f1, f2, f3} is used while the corresponding reference sample is {p0, p1, p2 and p3}, but p0 is not available, video encoder 20 and/or video decoder 30 may perform the interpolation process as **v=f0*p1+f1*p1+f2*p2+f3*p3. For example, to derive a value for an extended reference sample, video decoder 30 may perform a clipping operation performed on the set of reference samples such that a nearest available reference sample is used for deriving the value for the extended reference sample. Similarly, to derive a value for an extended reference sample, video encoder 20** may perform a clipping operation performed on the set of reference samples such that a nearest available reference sample is used for deriving the value for the extended reference sample.

Alternatively, or additionally, video encoder 20 and/or video decoder 30 may select an N-tap interpolation filter following rules described regarding the multiple interpolation filters. Alternatively, or additionally, a filter tap length may depend on the block size or shape, for example as in the above description. For example, video decoder 30 may generate, using a second interpolation filter and the value for the extended reference sample, prediction information. Similarly, video encoder 20 may generate, using a second interpolation filter and the value for the extended reference sample, prediction information.

For the intra prediction of an M×N block, instead of using an 2*(M+N)+1 reference samples for intra prediction, video encoder 20 and/or video decoder 30 may apply an extended reference sample buffer for intra prediction. For example, video decoder 30 may determine, using one or more characteristics of an interpolation filter, a number of reference samples to be stored at a reference buffer. Similarly, for example, video encoder 20 may determine, using one or more characteristics of an interpolation filter, a number of reference samples to be stored at a reference buffer.

More specifically, for example, for a M×N block of video data, video decoder 30 may determine, using one or more characteristics of an interpolation filter, a number of reference samples to be stored at a reference buffer to be greater than 2*(M+N)+1. Similarly, for example, video encoder 20 may determine, using one or more characteristics of an interpolation filter, a number of reference samples to be stored at a reference buffer to be greater than 2*(M+N)+1.

In some examples, video encoder 20 and/or video decoder 30 may extend the reference sample buffer by a threshold K, to the above row and/or the left column of reference samples. For instance, the threshold K may be 1, 2, 3, 4, or another threshold value. Said differently, for example, video decoder 30 may extend the number of reference samples from 2*(M+N)+1 by a threshold, along both a row and a column of the block of video data. Similarly, for example, video encoder 20 may extend the number of reference samples from 2*(M+N)+1 by a threshold, along both a row and a column of the block of video data.

In some examples, video encoder 20 and/or video decoder 30 may determine a number of extended reference samples by a number of filter tap N. In some examples, video encoder 20 and/or video decoder 30 may determine a number of extended reference samples by a number of filter tap N such that all the reference samples for the N-tap filter used in the current intra prediction direction are available.

Said differently, for example, video decoder 30 may determine a threshold based on the number of filter taps in the interpolation filter and may extend the number of reference samples from 2*(M+N)+1 by the threshold. For instance, video decoder 30 may determine a threshold of 2 (or 1) when using a 4-tap interpolation filter and may extend the number of reference samples from 2*(M+N)+1 by 2 (or 1). In some instances, video decoder 30 may determine a threshold of 3 (or 2) when using a 6-tap interpolation filter and may extend the number of reference samples from 2*(M+N)+1 by 3 (or 2).

Similarly, for example, video encoder 20 may determine a threshold based on the number of filter taps in the interpolation filter and may extend the number of reference samples from 2*(M+N)+1 by the threshold. For instance, video encoder 20 may determine a threshold of 2 (or 1) when using a 4-tap interpolation filter and may extend the number of reference samples from 2*(M+N)+1 by 2 (or 1). In some instances, video encoder 20 may determine a threshold of 3 (or 2) when using a 6-tap interpolation filter and may extend the number of reference samples from 2*(M+N)+1 by 3 (or 2).

In some examples, video encoder 20 and/or video decoder 30 may determine a number of extended reference samples by an intra prediction direction. In some examples, video encoder 20 and/or video decoder 30 may determine a number of extended reference samples by an intra prediction direction such that all the reference samples for the N-tap filter used in the current intra prediction direction are available.

Said differently, for example, video decoder 30 may determine a threshold using the intra-prediction direction of the interpolation filter and may extend the number of reference samples from 2*(M+N)+1 by the threshold. For instance, video decoder 30 may determine a threshold of 1 when the intra-prediction direction is 34 and may extend the number of reference samples from 2*(M+N)+1 by 1. In some instances, video decoder 30 may determine a threshold of 2 when 66 and may extend the number of reference samples from 2*(M+N)+1 by 2.

Similarly, for example, video encoder 20 may determine a threshold using the intra-prediction direction of the interpolation filter and may extend the number of reference samples from 2*(M+N)+1 by the threshold. For instance, video encoder 20 may determine a threshold of 1 when the intra-prediction direction is 34 and may extend the number of reference samples from 2*(M+N)+1 by 1. In some instances, video encoder 20 may determine a threshold of 2 when 66 and may extend the number of reference samples from 2*(M+N)+1 by 2.

Video decoder 30 and/or video encoder 20 may generate a plurality of values corresponding to the number of reference samples in the reference buffer. As used herein, to generate values corresponding to the number of reference samples in the reference buffer, a video coder may decode samples, reconstruct samples, or otherwise generate values. For example, video decoder 30 may decode samples corresponding to the number of reference samples in the reference buffer. In some examples, video encoder 20 may reconstruct samples corresponding to the number of reference samples in the reference buffer.

More specifically, for example, video encoder 20 and/or video decoder 30 may fill the extended part of reference sample buffer by neighboring reconstructed image samples. Said differently, for example, video decoder 30 may fill one or more values of the plurality of values using neighboring reconstructed image samples. Similarly, for example, video encoder 20 may fill one or more values of the plurality of values using neighboring reconstructed image samples.

In some examples, video encoder 20 and/or video decoder 30 may pad the extended part of reference sample buffer from available reference sample values in the reference sample buffer. Said differently, for example, video decoder 30 may pad one or more values of the plurality of values from available reference sample values in the reference buffer. Similarly, for example, video encoder 20 may pad one or more values of the plurality of values from available reference sample values in the reference buffer.

In some examples, video encoder 20 and/or video decoder 30 may use extended reference samples for the LM mode, planar mode and/or DC mode. In some examples, in LM mode, video encoder 20 and/or video decoder 30 may use the extended reference samples to derive the parameters of the linear model. Said differently, for example, video decoder 30 may derive parameters of a linear model using at least one value extended from 2*(M+N)+1 by the threshold. Similarly, for example, video encoder 20 may derive parameters of a linear model using at least one value extended from 2*(M+N)+1 by the threshold.

In some examples, in planar mode, video encoder 20 and/or video decoder 30 may use the extended reference samples for generating the prediction block. For example, video decoder 30 may generate a prediction block using at least one value extended from 2*(M+N)+1 by the threshold. Said differently, for example, video decoder 30 may generate prediction information for intra-prediction using the interpolation filter and the plurality of values. Similarly, for example, video encoder 20 may generate a prediction block using at least one value extended from 2*(M+N)+1 by the threshold. Said differently, for example, video encoder 20 may generate prediction information for intra-prediction using the interpolation filter and the plurality of values.

A video coder may reconstruct the block of video data based on the prediction information. As used herein, to reconstruct the block of video data, a video coder may perform a reconstruction loop of the block of video data, a decoding of the block of video data, or another reconstruction of the block of video data.

Video decoder 30 may reconstruct the block of video data based on the prediction information. For example, video decoder 30 may determine a predictive block for a coding unit for the block of video data using the predictive information. In this example, video decoder 30 may determine residual data for the coding unit. In this example, video decoder 30 may reconstruct a coding block of the coding unit by summing corresponding samples of the residual data and the predictive block for the coding unit.

Similarly, video encoder 20 may reconstruct the block of video data based on the prediction information. For example, video encoder 20 may determine a predictive block for a coding unit for the block of video data using the predictive information. In this example, video encoder 20 may determine residual data for the coding unit such that the residual data indicates differences between a coding block of the coding unit and the predictive block for the coding unit. In this example, video encoder 20 may partition the residual data for the coding unit into one or more transform blocks. In this example, video encoder 20 may apply a transform to the one or more transform blocks to generate one or more coefficient blocks. In this example, video encoder 20 may quantize coefficients in the one or more coefficient blocks.

In some examples, in DC mode, video encoder 20 and/or video decoder 30 may use the extended reference samples for predicting the predicted DC value. Said differently, for example, video decoder 30 may predict a predicted DC value using at least one value extended from 2*(M+N)+1 by the threshold. Similarly, for example, video encoder 20 may predict a predicted DC value using at least one value extended from 2*(M+N)+1 by the threshold.

In some examples, when performing reference sample mapping for extended top-row reference samples, for each of the extended reference samples, given the intra prediction direction, video encoder 20 and/or video decoder 30 may use one or several reference samples of the left-column to derive the value. Said differently, for example, video decoder 30 may derive one or more values of the plurality of values from available reference sample values in the reference buffer. Similarly, for example, video encoder 20 may derive one or more values of the plurality of values from available reference sample values in the reference buffer. However, when the "one or several reference samples of the left-column" are not available in the reference sample buffer, video encoder 20 and/or video decoder 30 may use the nearest available extended reference sample value for the current extended reference sample.

In some examples, video encoder 20 and/or video decoder 30 may add more reference samples to the buffer instead of the one corner sample. In the example, video encoder 20 and/or video decoder 30 may insert reference samples in between the reference samples derived from the left and/or above reference samples. The number of inserted samples may depend on a filter tap, which may be used to derive intra prediction according to the intra prediction direction. For instance, video encoder 20 and/or video decoder 30 may determine a number of inserted samples based on a filter tap and/or video encoder 20 and/or video decoder 30 may derive intra prediction according to the intra prediction direction. Video encoder 20 and/or video decoder 30 may derive the inserted samples from the nearest left and/or above neighbor references based on the intra mode direction. Additionally, or alternatively, video encoder 20 and/or video decoder 30 may apply a filter of certain tap length to the left and/or above neighboring samples. In the example, video encoder 20 and/or video decoder 30 may insert filtered samples into a reference buffer.

This following presents an embodiment of video encoder 20 and/or video decoder 30 applying multiple interpolation filters with sextic interpolation filter included.

In some examples, when the intra prediction mode is vertical-like angular prediction mode, if the width is less than or equal to 8, video encoder 20 and/or video decoder 30 may use the 6-tap sextic interpolation filter. Alternatively, or additionally, video encoder 20 and/or video decoder 30 may use the 4-tap Gaussian interpolation filter. In some examples, when the intra prediction is horizontal-like intra predictions, if the height is less than or equal to 8, video encoder 20 and/or video decoder 30 may use the 6-tap sextic interpolation filter. Alternatively, or additionally, video encoder 20 and/or video decoder 30 may use the 4-tap Gaussian interpolation filter.

An example 6-tap sextic interpolation filter is shown as follows.

```
Short g_aiIntraSexticFilter[32][6] =
{
 { 0, 0, 256, 0, 0, 0 }, // 0/32 position
 { 0, −4, 253, 9, −2, 0 }, // 1/32 position
 { 1, −7, 249, 17, −4, 0 }, // 2/32 position
 { 1, −10, 245, 25, −6, 1 }, // 3/32 position
 { 1, −13, 241, 34, −8, 1 }, // 4/32 position
 { 2, −16, 235, 44, −10, 1 }, // 5/32 position
 { 2, −18, 229, 53, −12, 2 }, // 6/32 position
 { 2, −20, 223, 63, −14, 2 }, // 7/32 position
 { 2, −22, 217, 72, −15, 2 }, // 8/32 position
 { 3, −23, 209, 82, −17, 2 }, // 9/32 position
 { 3, −24, 202, 92, −19, 2 }, // 10/32 position
 { 3, −25, 194, 101, −20, 3 }, // 11/32 position
 { 3, −25, 185, 111, −21, 3 }, // 12/32 position
 { 3, −26, 178, 121, −23, 3 }, // 13/32 position
 { 3, −25, 168, 131, −24, 3 }, // 14/32 position
 { 3, −25, 159, 141, −25, 3 }, // 15/32 position
 { 3, −25, 150, 150, −25, 3 }, // 16/32 position
 { 3, −25, 141, 159, −25, 3 }, // 17/32 position
 { 3, −24, 131, 168, −25, 3 }, // 18/32 position
 { 3, −23, 121, 178, −26, 3 }, // 19/32 position
 { 3, −21, 111, 185, −25, 3 }, // 20/32 position
 { 3, −20, 101, 194, −25, 3 }, // 21/32 position
 { 2, −19, 92, 202, −24, 3 }, // 22/32 position
 { 2, −17, 82, 209, −23, 3 }, // 23/32 position
 { 2, −15, 72, 217, −22, 2 }, // 24/32 position
```

-continued

```
{ 2, −14, 63, 223, −20, 2 }, // 25/32 position
{ 2, −12, 53, 229, −18, 2 }, // 26/32 position
{ 1, −10, 44, 235, −16, 2 }, // 27/32 position
{ 1, −8, 34, 241, −13, 1 }, // 28/32 position
{ 1, −6, 25, 245, −10, 1 }, // 29/32 position
{ 0, −4, 17, 249, −7, 1 }, // 30/32 position
{ 0, −2, 9, 253, −4, 0 }, // 31/32 position
};
```

An example 4-tap Gaussian interpolation filter is shown as follows.

```
Short g_aiIntraGaussFilter[32][4] =
{
 { 47, 161, 47, 1 }, // 0/32 position
 { 43, 161, 51, 1 }, // 1/32 position
 { 40, 160, 54, 2 }, // 2/32 position
 { 37, 159, 58, 2 }, // 3/32 position
 { 34, 158, 62, 2 }, // 4/32 position
 { 31, 156, 67, 2 }, // 5/32 position
 { 28, 154, 71, 3 }, // 6/32 position
 { 26, 151, 76, 3 }, // 7/32 position
 { 23, 149, 80, 4 }, // 8/32 position
 { 21, 146, 85, 4 }, // 9/32 position
 { 19, 142, 90, 5 }, // 10/32 position
 { 17, 139, 94, 6 }, // 11/32 position
 { 16, 135, 99, 6 }, // 12/32 position
 { 14, 131, 104, 7 }, // 13/32 position
 { 13, 127, 108, 8 }, // 14/32 position
 { 11, 123, 113, 9 }, // 15/32 position
 { 10, 118, 118, 10 }, // 16/32 position
 { 9, 113, 123, 11 }, // 17/32 position
 { 8, 108, 127, 13 }, // 18/32 position
 { 7, 104, 131, 14 }, // 19/32 position
 { 6, 99, 135, 16 }, // 20/32 position
 { 6, 94, 139, 17 }, // 21/32 position
 { 5, 90, 142, 19 }, // 22/32 position
 { 4, 85, 146, 21 }, // 23/32 position
 { 4, 80, 149, 23 }, // 24/32 position
 { 3, 76, 151, 26 }, // 25/32 position
 { 3, 71, 154, 28 }, // 26/32 position
 { 2, 67, 156, 31 }, // 27/32 position
 { 2, 62, 158, 34 }, // 28/32 position
 { 2, 58, 159, 37 }, // 29/32 position
 { 2, 54, 160, 40 }, // 30/32 position
 { 1, 51, 161, 43 }, // 31/32 position
};
```

Figure 13:
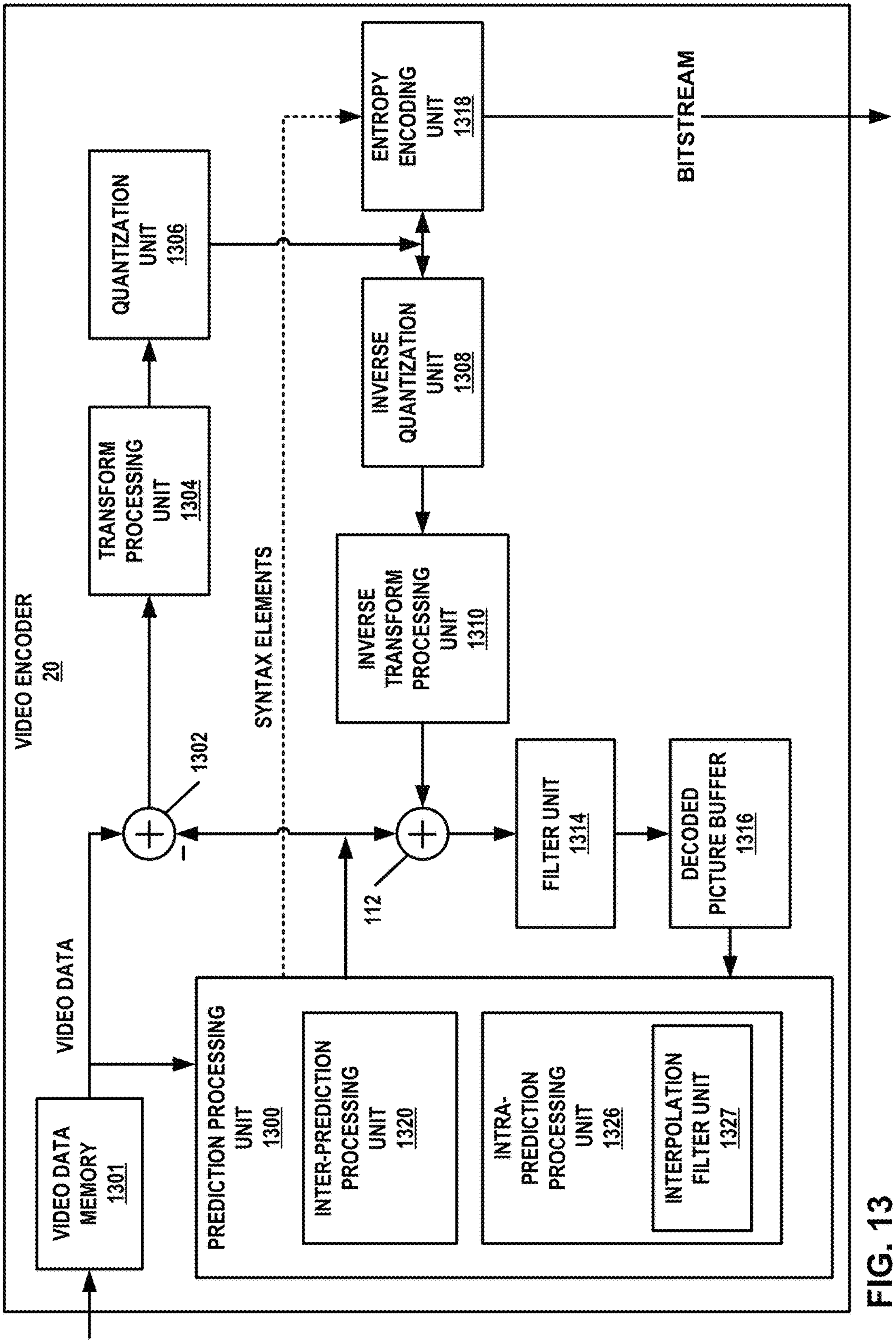
FIG. 13 is a block diagram illustrating an example video encoder that may implement one or more techniques described in this disclosure.

FIG. 13 is a block diagram illustrating an example video encoder 20 that may implement the techniques of this disclosure for using interpolation filters during intra prediction. FIG. 13 is provided for purposes of explanation and should not be considered limiting of the techniques as broadly exemplified and described in this disclosure. The techniques of this disclosure may be applicable to various coding standards or methods. The techniques shown in conceptual diagrams 1-13 may be used together with the techniques of this disclosure.

In the example of FIG. 13, video encoder 20 includes a prediction processing unit 1300, video data memory 1301, a residual generation unit 1302, a transform processing unit 1304, a quantization unit 1306, an inverse quantization unit 1308, an inverse transform processing unit 1310, a reconstruction unit 1312, a filter unit 1314, a decoded picture buffer 1316, and an entropy encoding unit 1318. In some examples, prediction processing unit 1300 may perform one or more of the techniques of the disclosure. Prediction processing unit 1300 includes an inter-prediction processing unit 1320 and an intra-prediction processing unit 1326. Inter-prediction processing unit 1320 may include a motion estimation unit and a motion compensation unit (not shown). In some examples, intra-prediction processing unit 1326 may perform one or more of the techniques of the disclosure.

Intra-prediction processing unit 1326 may include interpolation filter unit 1327. Interpolation filter unit 1327 may determine, using one or more characteristics of an interpolation filter, a number of reference samples to be stored at a reference buffer. For example, interpolation filter unit 1327 may determine a number of extended reference samples by a number of filter tap N. In some examples, interpolation filter unit 1327 may determine a number of extended reference samples by an intra prediction direction.

Interpolation filter unit 1327 may select an interpolation filter from multiple interpolation filters based on the block of video data. For example, interpolation filter unit 1327 may select an interpolation filter tap length based on whether the required reference samples are out of the reference sample buffer, e.g., unavailable.

Interpolation filter unit 1327 may derive, using a first interpolation filter, a value for an extended reference sample based on the set of reference samples from neighboring reconstructed reference samples. For example, interpolation filter unit 1327 may apply an N-tap interpolation filter to the neighboring reference samples to derive the value of each extended reference sample.

Video data memory 1301 may be configured to store video data to be encoded by the components of video encoder 20. The video data stored in video data memory 1301 may be obtained, for example, from video source 18. Decoded picture buffer 1316 may be a reference picture memory that stores reference video data for use in encoding video data by video encoder 20, e.g., in intra- or inter-coding modes. Video data memory 1301 and decoded picture buffer 1316 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1301 and decoded picture buffer 1316 may be provided by the same memory device or separate memory devices. In various examples, video data memory 1301 may be on-chip with other components of video encoder 20, or off-chip relative to those components. Video data memory 1301 may be the same as or part of storage media 20 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 1300 may perform partitioning to divide the CTBs of the CTU into progressively-smaller blocks. The smaller blocks may be coding blocks of CUs. For example, prediction processing unit 1300 may partition a CTB associated with a CTU according to a tree structure.

Video encoder 20 may encode CUs of a CTU to generate encoded representations of the CUs (i.e., coded CUs). As part of encoding a CU, prediction processing unit 1300 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 1320 may generate predictive data for a PU by performing inter prediction on each PU of a CU. The predictive data for the PU may include predictive blocks of the PU and motion information for the PU. Inter-prediction processing unit 1320 may perform different operations for a PU of a CU depending on whether the PU is in an I slice, a P slice, or a B slice. In an I slice, all PUs are intra predicted. Hence, if the PU is in an I slice, inter-prediction processing unit 1320 does not perform inter prediction on the PU. Thus, for blocks encoded in I-mode, the predicted block is formed using spatial prediction from previously-encoded neighboring blocks within the same frame. If a PU is in a P slice, inter-prediction processing unit 1320 may use uni-directional inter prediction to generate a predictive block of the PU. If a PU is in a B slice, inter-prediction processing unit 1320 may use uni-directional or bi-directional inter prediction to generate a predictive block of the PU.

Intra-prediction processing unit 1326 may generate predictive data for a PU by performing intra prediction on the PU. The predictive data for the PU may include predictive blocks of the PU and various syntax elements. Intra-prediction processing unit 1326 may perform intra prediction on PUs in I slices, P slices, and B slices.

To perform intra prediction on a PU, intra-prediction processing unit 1326 may use multiple intra prediction modes to generate multiple sets of predictive data for the PU. Intra-prediction processing unit 1326 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 1326 may use various numbers of intra prediction modes, e.g., 33 directional intra prediction modes. In some examples, the number of intra prediction modes may depend on the size of the region associated with the PU.

Prediction processing unit 1300 may select the predictive data for PUs of a CU from among the predictive data generated by inter-prediction processing unit 1320 for the PUs or the predictive data generated by intra-prediction processing unit 1326 for the PUs. In some examples, prediction processing unit 1300 selects the predictive data for the PUs of the CU based on rate/distortion metrics of the sets of predictive data. The predictive blocks of the selected predictive data may be referred to herein as the selected predictive blocks. In some examples, prediction processing unit 1300 and/or intra-prediction processing unit 1326 may apply multiple interpolation filters. For instance, prediction processing unit 1300 and/or intra-prediction processing unit 1326 may perform any combination of techniques described herein. More specifically, for instance, prediction processing unit 1300 and/or intra-prediction processing unit 1326 may select an interpolation filter and generate, using the interpolation filter, prediction information for reconstructing a block of video data. In some instances, prediction processing unit 1300 and/or intra-prediction processing unit 1326 may derive a value for an extended reference sample and generate, using the value for the extended reference sample, prediction information for reconstructing a block of video data. In some instances, prediction processing unit 1300 and/or intra-prediction processing unit 1326 may generate a value for an extended reference sample buffer and generate, using the value for the extended reference sample buffer, prediction information for reconstructing a block of video data.

Residual generation unit 1302 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 1302 may generate the residual blocks of the CU such that each sample in the residual blocks has a value equal to a difference between a sample in a coding block of the CU and a corresponding sample in a corresponding selected predictive block of a PU of the CU.

Transform processing unit 1304 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 1304 may generate transform coefficient blocks for each TU of a CU by applying one or more transforms to the transform blocks of the TU. Transform processing unit 1304 may apply various transforms to a transform block associated with a TU. For example, transform processing unit 1304 may apply a discrete cosine transform (DCT), a directional transform, or a conceptually similar transform to a transform block. In some examples, transform processing unit 1304 does not apply transforms to a transform block. In such examples, the transform block may be treated as a transform coefficient block.

Quantization unit 1306 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 1306 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 1308 and inverse transform processing unit 1310 may apply inverse quantization and inverse transforms to a coefficient block, respectively, to reconstruct a residual block from the coefficient block. Reconstruction unit 1312 may add the reconstructed residual block to corresponding samples from one or more predictive blocks generated by prediction processing unit 1300 to produce a reconstructed transform block associated with a TU. By reconstructing transform blocks for each TU of a CU in this way, video encoder 20 may reconstruct the coding blocks of the CU.

Filter unit 1314 may perform one or more deblocking operations to reduce blocking artifacts in the coding blocks associated with a CU. Decoded picture buffer 1316 may store the reconstructed coding blocks after filter unit 1314 performs the one or more deblocking operations on the reconstructed coding blocks. Inter-prediction processing unit 1320 may use a reference picture that contains the reconstructed coding blocks to perform inter prediction on PUs of other pictures. In addition, intra-prediction processing unit 1326 may use reconstructed coding blocks in decoded picture buffer 1316 to perform intra prediction on other PUs in the same picture as the CU.

Entropy encoding unit 1318 may receive data from other functional components of video encoder 20. For example, entropy encoding unit 1318 may receive coefficient blocks from quantization unit 1306 and may receive syntax elements from prediction processing unit 1300. Entropy encoding unit 1318 may perform one or more entropy encoding operations on the data to generate entropy-encoded data. For example, entropy encoding unit 1318 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 1318. For instance, the bitstream may include data that represents values of transform coefficients for a CU.

Figure 14:
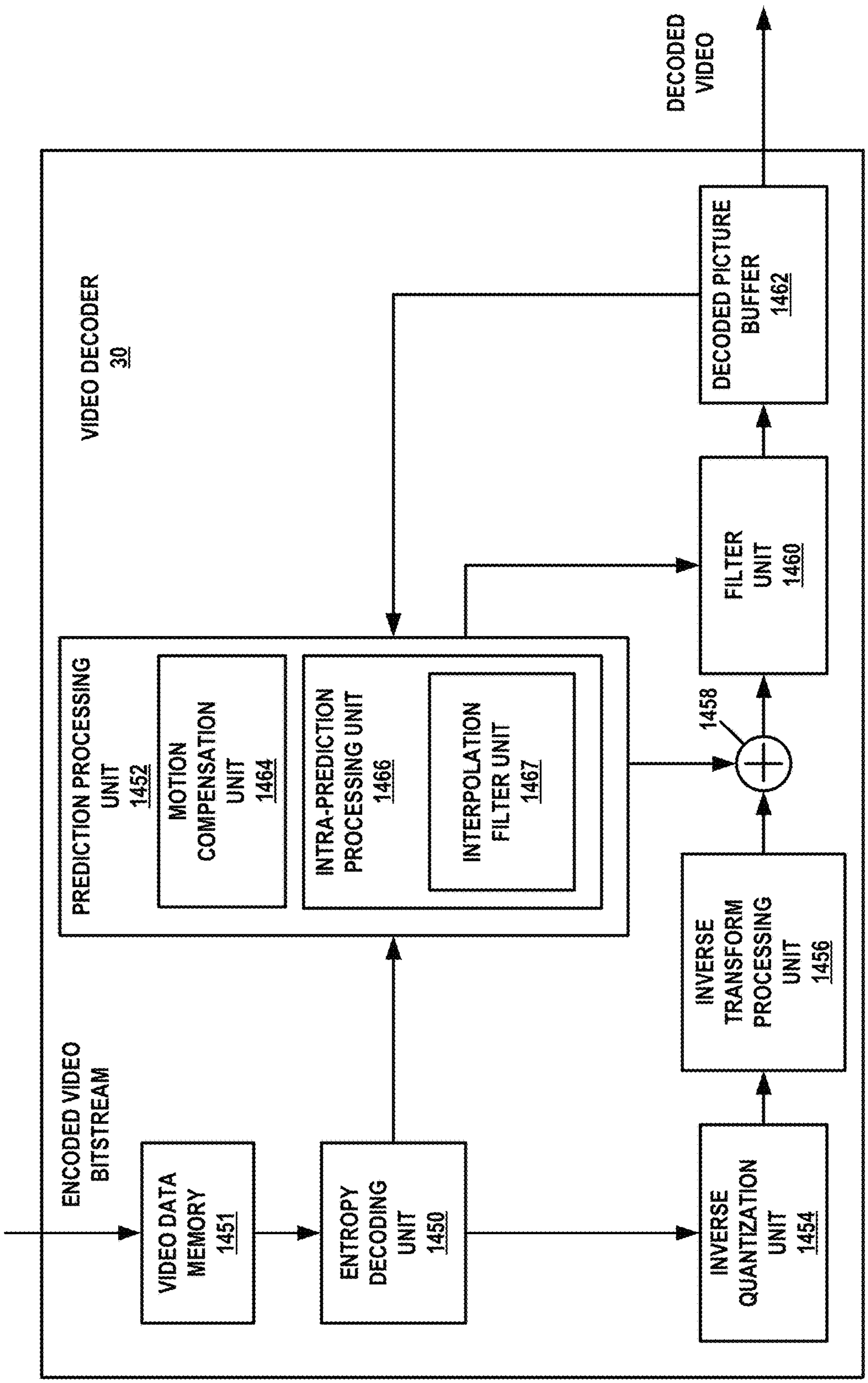
FIG. 14 is a block diagram illustrating an example video decoder that may implement one or more techniques described in this disclosure.

FIG. 14 is a block diagram illustrating an example video decoder 30 that is configured to implement the techniques of this disclosure for using interpolation filters during intra prediction. FIG. 14 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods. The techniques shown in conceptual diagrams 1-14 may be used together with the techniques of this disclosure.

In the example of FIG. 14, video decoder 30 includes an entropy decoding unit 1450, video data memory 1451, a prediction processing unit 1452, an inverse quantization unit 1454, an inverse transform processing unit 1456, a reconstruction unit 1458, a filter unit 1460, and a decoded picture buffer 1462. In some examples, prediction processing unit 1452 may perform one or more of the techniques of the disclosure. Prediction processing unit 1452 includes a motion compensation unit 1464 and an intra-prediction processing unit 1466. In some examples, intra-prediction processing unit 1466 may perform one or more of the techniques of the disclosure. In some examples, prediction processing unit 1452 and/or intra-prediction processing unit 1466 may apply multiple interpolation filters. For instance, prediction processing unit 1452 and/or intra-prediction processing unit 1466 may perform any combination of techniques described herein. More specifically, for instance, prediction processing unit 1452 and/or intra-prediction processing unit 1466 may select an interpolation filter and generate, using the interpolation filter, prediction information for reconstructing a block of video data. In some instances, prediction processing unit 1452 and/or intra-prediction processing unit 1466 may derive a value for an extended reference sample and generate, using the value for the extended reference sample, prediction information for reconstructing a block of video data. In some instances, prediction processing unit 1452 and/or intra-prediction processing unit 1466 may generate a value for an extended reference sample buffer and generate, using the value for the extended reference sample buffer, prediction information for reconstructing a block of video data. In other examples, video decoder 30 may include more, fewer, or different functional components.

Intra-prediction processing unit 1466 may include interpolation filter unit 1467. Interpolation filter unit 1467 may determine, using one or more characteristics of an interpolation filter, a number of reference samples to be stored at a reference buffer. For example, interpolation filter unit 1467 may determine a number of extended reference samples by a number of filter tap N. In some examples, interpolation filter unit 1467 may determine a number of extended reference samples by an intra prediction direction.

Interpolation filter unit 1467 may select an interpolation filter from multiple interpolation filters based on the block of video data. For example, interpolation filter unit 1467 may select an interpolation filter tap length based on whether the required reference samples are out of the reference sample buffer, e.g., unavailable.

Interpolation filter unit 1467 may derive, using a first interpolation filter, a value for an extended reference sample based on the set of reference samples from neighboring reconstructed reference samples. For example, interpolation filter unit 1467 may apply an N-tap interpolation filter to the neighboring reference samples to derive the value of each extended reference sample.

Video data memory 1451 may store encoded video data, such as an encoded video bitstream, to be decoded by the components of video decoder 30. The video data stored in video data memory 1451 may be obtained, for example, from computer-readable medium 16, e.g., from a local video source, such as a camera, via wired or wireless network communication of video data, or by accessing physical data storage media. Video data memory 1451 may form a coded picture buffer (CPB) that stores encoded video data from an encoded video bitstream. Decoded picture buffer 1462 may be a reference picture memory that stores reference video data for use in decoding video data by video decoder 30, e.g., in intra- or inter-coding modes, or for output. Video data memory 1451 and decoded picture buffer 1462 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1451 and decoded picture buffer 1462 may be provided by the same memory device or separate memory devices. In various examples, video data memory 1451 may be on-chip with other components of video decoder 30, or off-chip relative to those components. Video data memory 1451 may be the same as or part of storage media 28 of FIG. 1.

Video data memory 1451 receives and stores encoded video data (e.g., NAL units) of a bitstream. Entropy decoding unit 1450 may receive encoded video data (e.g., NAL units) from video data memory 1451 and may parse the NAL units to obtain syntax elements. Entropy decoding unit 1450 may entropy decode entropy-encoded syntax elements in the NAL units. Prediction processing unit 1452, inverse quantization unit 1454, inverse transform processing unit 1456, reconstruction unit 1458, and filter unit 1460 may generate decoded video data based on the syntax elements extracted from the bitstream. Entropy decoding unit 1450 may perform a process generally reciprocal to that of entropy encoding unit 1318.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 1454 may inverse quantize, i.e., de-quantize, coefficient blocks associated with the TU. After inverse quantization unit 1454 inverse quantizes a coefficient block, inverse transform processing unit 1456 may apply one or more inverse transforms to the coefficient block in order to generate a residual block associated with the TU. For example, inverse transform processing unit 1456 may apply an inverse DCT, an inverse integer transform, an inverse Karhunen-Loeve transform (KLT), an inverse rotational transform, an inverse directional transform, or another inverse transform to the coefficient block.

Inverse quantization unit 1454 may perform particular techniques of this disclosure. For example, for at least one respective quantization group of a plurality of quantization groups within a CTB of a CTU of a picture of the video data, inverse quantization unit 1454 may derive, based at least in part on local quantization information signaled in the bitstream, a respective quantization parameter for the respective quantization group. Additionally, in this example, inverse quantization unit 1454 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 1456, reconstruction unit 1458, and filter unit 1460) may reconstruct, based on inverse quantized transform coefficients of the transform block, a coding block of the CU.

If a PU is encoded using intra prediction, intra-prediction processing unit 1466 may perform intra prediction to generate predictive blocks of the PU. Intra-prediction processing unit 1466 may use an intra prediction mode to generate the predictive blocks of the PU based on samples spatially-neighboring blocks. Intra-prediction processing unit 1466 may determine the intra prediction mode for the PU based on one or more syntax elements obtained from the bitstream.

If a PU is encoded using inter prediction, entropy decoding unit 1450 may determine motion information for the PU. Motion compensation unit 1464 may determine, based on the motion information of the PU, one or more reference blocks. Motion compensation unit 1464 may generate, based on the one or more reference blocks, predictive blocks (e.g., predictive luma, Cb and Cr blocks) for the PU.

Reconstruction unit 1458 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 1458 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 1460 may perform a deblocking operation to reduce blocking artifacts associated with the coding blocks of the CU. Video decoder 30 may store the coding blocks of the CU in decoded picture buffer 1462. Decoded picture buffer 1462 may provide reference pictures for subsequent motion compensation, intra prediction, and presentation on a display device, such as display device 32 of FIG. 1. For instance, video decoder 30 may perform, based on the blocks in decoded picture buffer 1462, intra prediction or inter prediction operations for PUs of other CUs.

Figure 15:
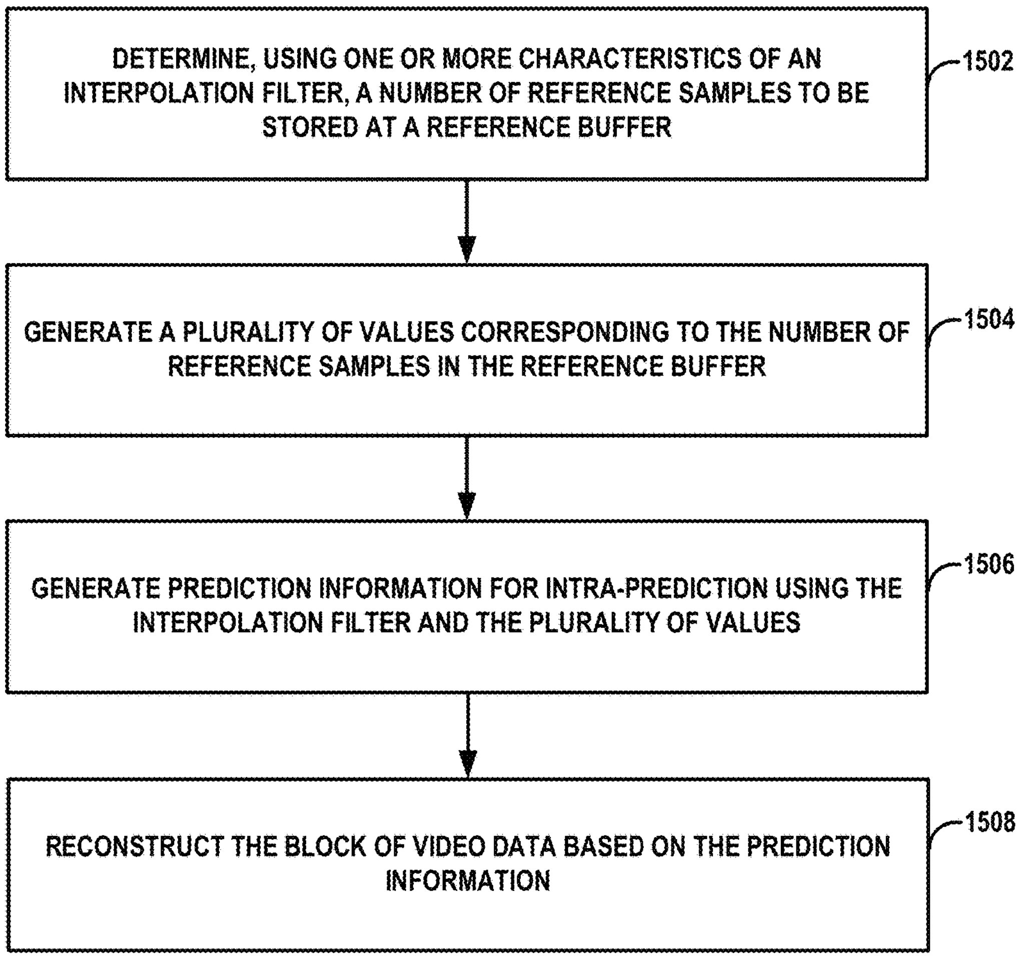
FIG. 15 is a flowchart illustrating a first example coding method of this disclosure.

FIG. 15 is a flow diagram illustrating an example coding of video data that may implement one or more techniques described in this disclosure. As described, the example techniques of FIG. 15 may be performed by video encoder 20 or video decoder 30. In the example of FIG. 15, a video coder determines, using one or more characteristics of an interpolation filter, a number of reference samples to be stored at a reference buffer (1502). For example, video encoder 20 and/or video decoder 30 may determine a number of extended reference samples by a number of filter tap N. In some examples, video encoder 20 and/or video decoder 30 may determine a number of extended reference samples by an intra prediction direction.

The video coder generates a plurality of values corresponding to the number of reference samples in the reference buffer (1504). For example, video encoder 20 and/or video decoder 30 may fill the extended part of reference sample buffer by neighboring reconstructed image samples. In some examples, video encoder 20 and/or video decoder 30 may pad the extended part of reference sample buffer from available reference sample values in the reference sample buffer. In some examples, video encoder 20 and/or video decoder 30 may use one or several reference samples of the left-column to derive the value.

The video coder generates prediction information for intra-prediction using the interpolation filter and the plurality of values (1506). For example, video encoder 20 and/or video decoder 30 may generate a prediction block using at least one value extended from 2*(M+N)+1 by a threshold.

The video coder reconstructs the block of video data based on the prediction information (1508). For example, video decoder 30 determines a predictive block for a coding unit for the block of video data using the predictive information. In this example, video decoder 30 determines residual data for the coding unit. In this example, video decoder 30 reconstructs a coding block of the coding unit by summing corresponding samples of the residual data and the predictive block for the coding unit.

In some examples, video encoder 20 determines a predictive block for a coding unit for the block of video data using the predictive information. In this example, video encoder 20 determines residual data for the coding unit such that the residual data indicates differences between a coding block of the coding unit and the predictive block for the coding unit. In this example, video encoder 20 partitions the residual data for the coding unit into one or more transform blocks. In this example, video encoder 20 applies a transform to the one or more transform blocks to generate one or more coefficient blocks. In this example, video encoder 20 quantizes coefficients in the one or more coefficient blocks.

Figure 16:
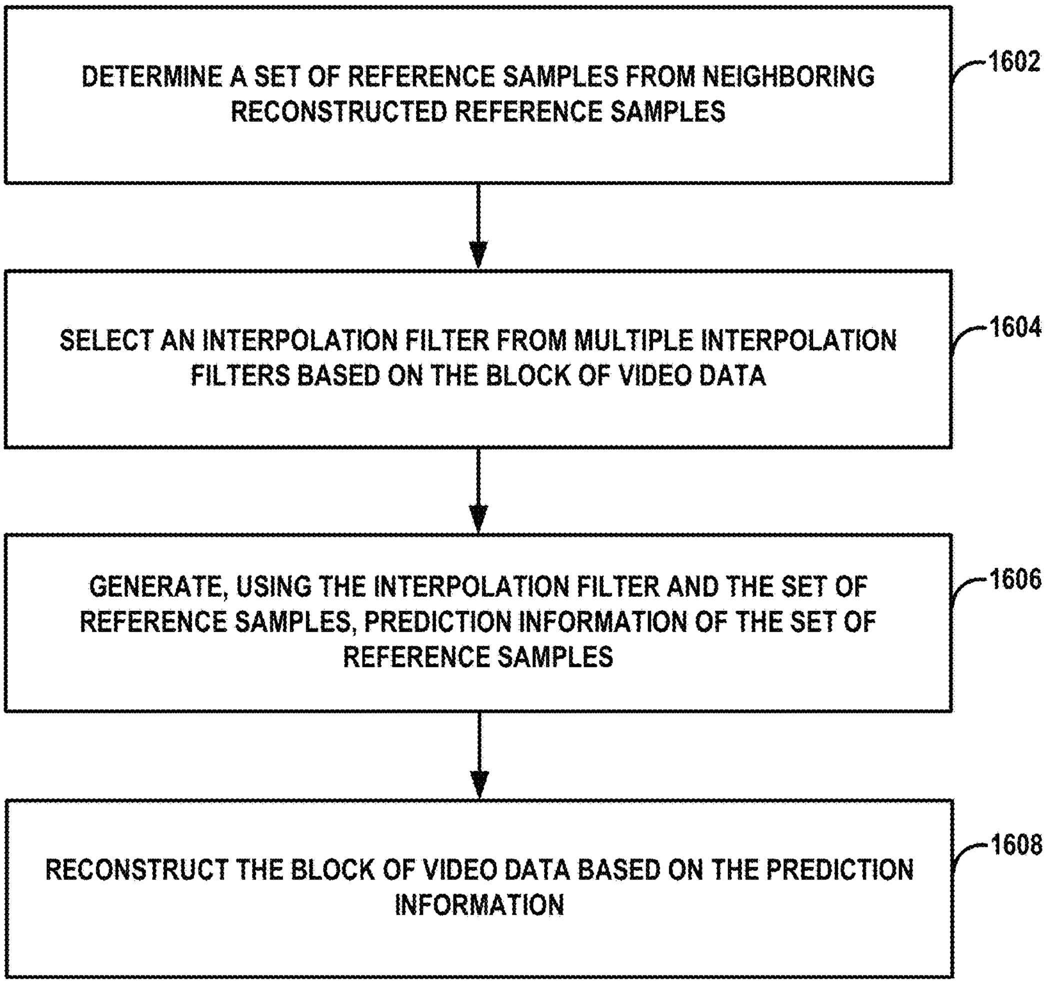
FIG. 16 is a flowchart illustrating a second example coding method of this disclosure.

FIG. 16 is a flow diagram illustrating an example coding of video data that may implement one or more techniques described in this disclosure. As described, the example techniques of FIG. 16 may be performed by video encoder 20 or video decoder 30. In the example of FIG. 16, a video coder determines a set of reference samples from neighboring reconstructed reference samples (1602). The video coder selects an interpolation filter from multiple interpolation filters based on the block of video data (1604). For example, video encoder 20 and/or video decoder 30 selects an interpolation filter tap length based on whether the required reference samples are out of the reference sample buffer, e.g., unavailable. The video coder generates, using the interpolation filter and the set of reference samples, prediction information of the set of reference samples (1606).

Video encoder 20 and/or video decoder 30 may select, for each portion of a plurality of portions of a block of video data, an interpolation filter from multiple interpolation filters based whether the required reference samples are out of the reference sample buffer, e.g., unavailable. For example, video encoder 20 and/or video decoder 30 may select, for a first sample of a block of video data, a first interpolation filter (e.g., a sextic interpolation filter) when required reference samples for applying the first filter to the first sample are in the reference sample buffer. In this example, video encoder 20 and/or video decoder 30 may select, for a second sample of the block of video data, a second interpolation filter (e.g., a cubic interpolation filter) when required reference samples for applying the first filter (e.g., a sextic interpolation filter) to the second sample are out of the reference sample buffer, e.g., unavailable and when required reference samples for applying the second filter to the second sample are in the reference sample buffer.

The video coder reconstructs the block of video data based on the prediction information (1608). For example, video decoder 30 determines a predictive block for a coding unit for the block of video data using the predictive information. In this example, video decoder 30 determines residual data for the coding unit. In this example, video decoder 30 reconstructs a coding block of the coding unit by summing corresponding samples of the residual data and the predictive block for the coding unit.

In some examples, video encoder 20 determines a predictive block for a coding unit for the block of video data using the predictive information. In this example, video encoder 20 determines residual data for the coding unit such that the residual data indicates differences between a coding block of the coding unit and the predictive block for the coding unit. In this example, video encoder 20 partitions the residual data for the coding unit into one or more transform blocks. In this example, video encoder 20 applies a transform to the one or more transform blocks to generate one or more coefficient blocks. In this example, video encoder 20 quantizes coefficients in the one or more coefficient blocks.

Figure 17:
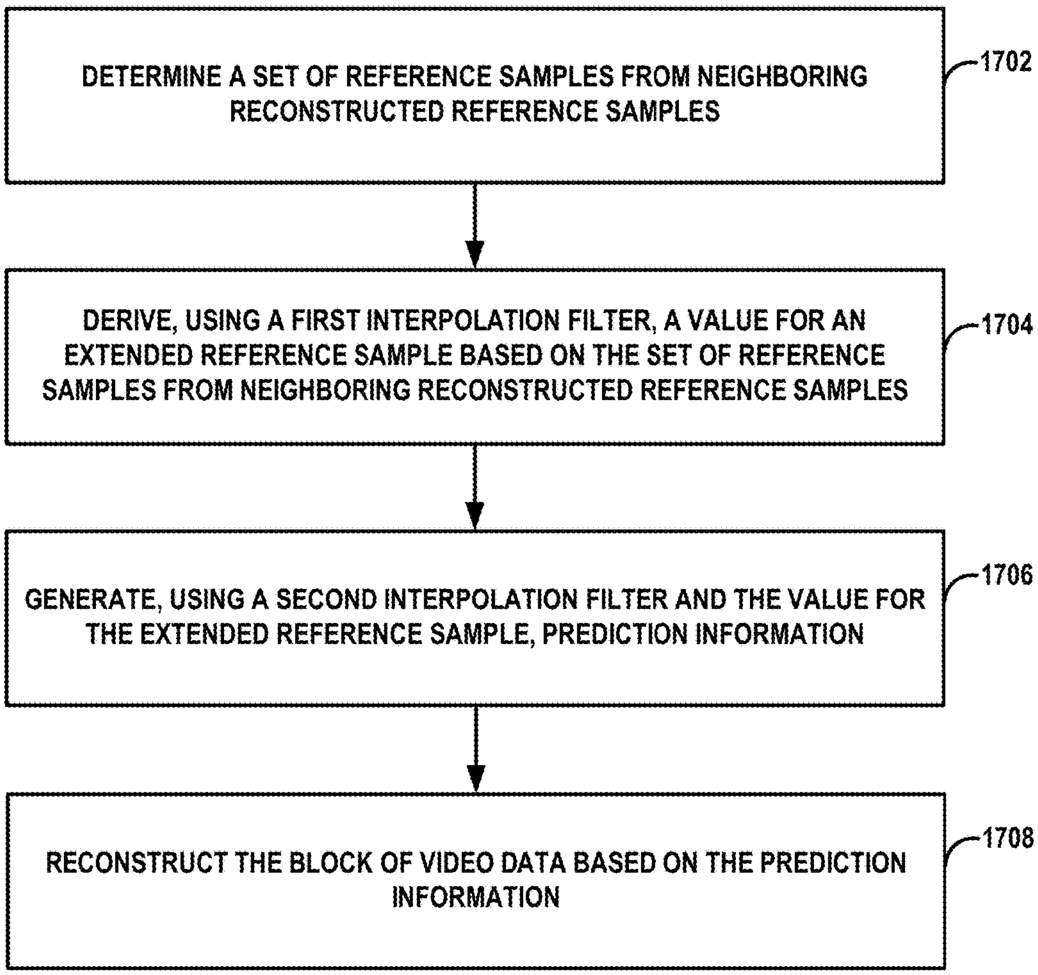
FIG. 17 is a flowchart illustrating a third example coding method of this disclosure.

FIG. 17 is a flow diagram illustrating an example coding of video data that may implement one or more techniques described in this disclosure. As described, the example techniques of FIG. 17 may be performed by video encoder 20 or video decoder 30. In the example of FIG. 17, a video coder determines a set of reference samples from neighboring reconstructed reference samples (1702). The video coder derives, using a first interpolation filter, a value for an extended reference sample based on the set of reference samples from neighboring reconstructed reference samples (1704). For example, video encoder 20 and/or video decoder 30 applies an N-tap interpolation filter to the neighboring reference samples to derive the value of each extended reference sample. The video coder generates, using a second interpolation filter and the value for the extended reference sample, prediction information (1706).

The video coder reconstructs the block of video data based on the prediction information (1708). For example, video decoder 30 determines a predictive block for a coding unit for the block of video data using the predictive information. In this example, video decoder 30 determines residual data for the coding unit. In this example, video decoder 30 reconstructs a coding block of the coding unit by summing corresponding samples of the residual data and the predictive block for the coding unit.

In some examples, video encoder 20 determines a predictive block for a coding unit for the block of video data using the predictive information. In this example, video encoder 20 determines residual data for the coding unit such that the residual data indicates differences between a coding block of the coding unit and the predictive block for the coding unit. In this example, video encoder 20 partitions the residual data for the coding unit into one or more transform blocks. In this example, video encoder 20 applies a transform to the one or more transform blocks to generate one or more coefficient blocks. In this example, video encoder 20 quantizes coefficients in the one or more coefficient blocks.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing a block of video data, the method comprising:

selecting an interpolation filter from a plurality of interpolation filters for the block of video data based on a size of the block of video data and based on an intra-prediction mode for the block of video data, wherein the plurality of interpolation filters comprises a Gaussian filter and a discrete cosine transform (DCT) based filter;

determining, using one or more characteristics of the interpolation filter, a number of reference samples to be stored at a reference buffer;

generating a plurality of values corresponding to the number of reference samples in the reference buffer, wherein generating the plurality of values comprises increasing the number of reference samples in the reference buffer by a threshold along both a row and a column of the block of video data;

generating prediction information for intra-prediction using the interpolation filter and the plurality of values; and reconstructing the block of video data based on the prediction information.

2. The method of claim 1, wherein the block of video data is an M×N block of video data and wherein increasing the number of reference samples comprises:

increasing the number of reference samples to be greater than 2*(M+N)+1 by the threshold along both the row and the column of the block of video data.

3. The method of claim 2, further comprising:

deriving linear parameters of a linear model using at least one value increased from 2*(M+N)+1 by the threshold; and predicting chroma samples for the block of video data based on the linear parameters.

4. The method of claim 2, further comprising:

generating a prediction block using at least one value increased from 2*(M+N)+1 by the threshold.

5. The method of claim 2, further comprising:

predicting a predicted DC value using at least one value increased from 2*(M+N)+1 by the threshold.

6. The method of claim 1, wherein the one or more characteristics of the interpolation filter comprises a number of filter taps in the interpolation filter and wherein determining the number of reference samples comprises:

determining the threshold based on the number of filter taps in the interpolation filter.

7. The method of claim 1, wherein the one or more characteristics of the interpolation filter comprise an intra-prediction direction of the interpolation filter and wherein determining the number of reference samples comprises:

determining the threshold using the intra-prediction direction of the interpolation filter.

8. The method of claim 1, wherein generating the plurality of values for the reference buffer comprises filling one or more values of the plurality of values using neighboring reconstructed image samples.

9. The method of claim 1, wherein generating the plurality of values for the reference buffer comprises padding one or more values of the plurality of values from available reference sample values in the reference buffer.

10. The method of claim 9, wherein padding the one or more values comprises padding a value of the one or more values using a nearest available reference sample value.

11. The method of claim 1, wherein reconstructing the block of video data comprises:

determining a predictive block for a coding unit for the block of video data using the prediction information;

determining residual data for the coding unit; and reconstructing a coding block of the coding unit by summing corresponding samples of the residual data and the predictive block for the coding unit.

12. The method of claim 1, wherein reconstructing the block of video data comprises:

determining a predictive block for a coding unit for the block of video data using the prediction information;

determining residual data for the coding unit such that the residual data indicates differences between a coding block of the coding unit and the predictive block for the coding unit;

partitioning the residual data for the coding unit into one or more transform blocks;

applying a transform to the one or more transform blocks to generate one or more coefficient blocks; and quantizing coefficients in the one or more coefficient blocks.

13. The method of claim 1, wherein the threshold is 1.

14. An apparatus for processing a block of video data, the apparatus comprising:

a memory configured to store the video data; and one or more processors configured to:

select an interpolation filter from a plurality of interpolation filters for the block of video data based on a size of the block of video data and based on an intra-prediction mode for the block of video data, wherein the plurality of interpolation filters comprises a Gaussian filter and a discrete cosine transform (DCT) based filter;

determine, using one or more characteristics of the interpolation filter, a number of reference samples to be stored at a reference buffer;

generate a plurality of values corresponding to the number of reference samples in the reference buffer, wherein, to generate the plurality of values, the one or more processors are configured to increase the number of reference samples in the reference buffer by a threshold along both a row and a column of the block of video data;

generate prediction information for intra-prediction using the interpolation filter and the plurality of values; and reconstruct the block of video data based on the prediction information.

15. The apparatus of claim 14, wherein the block of video data is an M×N block of video data and wherein, to increase the number of reference samples, the one or more processors are configured to:

increase the number of reference samples to be greater than 2*(M+N)+1 by the threshold along both the row and the column of the block of video data.

16. The apparatus of claim 15, wherein the one or more processors are configured to:

derive linear parameters of a linear model using at least one value increased from 2*(M+N)+1 by the threshold; and predict chroma samples for the block of video data based on the linear parameters.

17. The apparatus of claim 15, wherein the one or more processors are configured to:

generate a prediction block using at least one value increased from 2*(M+N)+1 by the threshold.

18. The apparatus of claim 15, wherein the one or more processors are configured to:

predict a predicted DC value using at least one value increased from 2*(M+N)+1 by the threshold.

19. The apparatus of claim 14, wherein the one or more characteristics of the interpolation filter comprises a number of filter taps in the interpolation filter and wherein, to determine the number of reference samples, the one or more processors are configured to:

determine the threshold based on the number of filter taps in the interpolation filter.

20. The apparatus of claim 14, wherein the one or more characteristics of the interpolation filter comprise an intra-prediction direction of the interpolation filter and wherein, to determine the number of reference samples, the one or more processors are configured to:

determine the threshold using the intra-prediction direction of the interpolation filter.

21. The apparatus of claim 14, wherein, to generate the plurality of values for the reference buffer, the one or more processors are configured to fill one or more values of the plurality of values using neighboring reconstructed image samples.

22. The apparatus of claim 14, wherein, to generate the plurality of values for the reference buffer, the one or more processors are configured to pad one or more values of the plurality of values from available reference sample values in the reference buffer.

23. The apparatus of claim 22, wherein, to pad the one or more values, the one or more processors are configured to pad a value of the one or more values using a nearest available reference sample value.

24. The apparatus of claim 14, wherein, to reconstruct the block of video data, the one or more processors are configured to:

determine a predictive block for a coding unit for the block of video data using the prediction information;

determine residual data for the coding unit; and reconstruct a coding block of the coding unit by summing corresponding samples of the residual data and the predictive block for the coding unit.

25. The apparatus of claim 14, wherein, to reconstruct the block of video data, the one or more processors are configured to:

determine a predictive block for a coding unit for the block of video data using the prediction information;

determine residual data for the coding unit such that the residual data indicates differences between a coding block of the coding unit and the predictive block for the coding unit;

partition the residual data for the coding unit into one or more transform blocks;

apply a transform to the one or more transform blocks to generate one or more coefficient blocks; and quantize coefficients in the one or more coefficient blocks.

26. The apparatus of claim 14, wherein the apparatus comprises one or more of a camera, a computer, a mobile device, a broadcast receiver device, or a set-top box.

27. The apparatus of claim 14, wherein the apparatus comprises at least one of:

an integrated circuit;

a microprocessor; or a wireless communication device.

28. The apparatus of claim 14, wherein the threshold is 1.

29. A non-transitory computer-readable storage medium storing instructions that, when executed, cause one or more processors to:

select an interpolation filter from a plurality of interpolation filters for a block of video data based on a size of the block of video data and based on an intra-prediction mode for the block of video data, wherein the plurality of interpolation filters comprises a Gaussian filter and a discrete cosine transform (DCT) based filter;

determine, using one or more characteristics of the interpolation filter, a number of reference samples to be stored at a reference buffer;

generate a plurality of values corresponding to the number of reference samples in the reference buffer, wherein, to generate the plurality of values, the instructions further cause the one or more processors to increase the number of reference samples in the reference buffer by a threshold along both a row and a column of the block of video data;

generate prediction information for intra-prediction using the interpolation filter and the plurality of values; and reconstruct the block of video data based on the prediction information.

30. An apparatus for processing video data, the apparatus comprising:

means for selecting an interpolation filter from a plurality of interpolation filters for a block of video data based on a size of the block of video data and based on an intra-prediction mode for the block of video data, wherein the plurality of interpolation filters comprises a Gaussian filter and a discrete cosine transform (DCT) based filter;

means for determining, using one or more characteristics of the interpolation filter, a number of reference samples to be stored at a reference buffer;

means for generating a plurality of values corresponding to the number of reference samples in the reference buffer, wherein the means for generating the plurality of values comprises means for increasing the number of reference samples in the reference buffer by a threshold along both a row and a column of the block of video data;

means for generating prediction information for intra-prediction using the interpolation filter and the plurality of values; and means for reconstructing the block of video data based on the prediction information.

* * * * *